US012600132B2

(12) United States Patent
Koyano et al.

(10) Patent No.: US 12,600,132 B2
(45) Date of Patent: Apr. 14, 2026

(54) HEAD CHIP, LIQUID JET HEAD, LIQUID JET RECORDING DEVICE, AND METHOD OF MANUFACTURING HEAD CHIP

(71) Applicant: SII Printek Inc., Chiba (JP)

(72) Inventors: Takanori Koyano, Chiba (JP); Daichi Nishikawa, Chiba (JP); Yuzuru Kubota, Chiba (JP)

(73) Assignee: SII PRINTEK INC., Chiba (JP)

( * ) Notice: Subject to any disclaimer, the term of this patent is extended or adjusted under 35 U.S.C. 154(b) by 202 days.

(21) Appl. No.: 18/528,166

(22) Filed: Dec. 4, 2023

(65) Prior Publication Data

US 2024/0190130 A1 Jun. 13, 2024

(30) Foreign Application Priority Data

Dec. 7, 2022 (JP) ................................ 2022-195605

(51) Int. Cl.
*B41J 2/16* (2006.01)
*B41J 2/14* (2006.01)

(52) U.S. Cl.
CPC .......... *B41J 2/1621* (2013.01); *B41J 2/1433* (2013.01); *B41J 2002/14419* (2013.01)

(58) Field of Classification Search
CPC .................... B41J 2/1621; B41J 2/1433; B41J 2002/14419; B41J 2202/12; B41J 2/14209;

(Continued)

(56) References Cited

U.S. PATENT DOCUMENTS

2020/0031134 A1* 1/2020 Mizuno ...................... B41J 2/18

FOREIGN PATENT DOCUMENTS

CN 111169169 * 5/2020 .......... B41J 2/14233
CN 111169169 A * 5/2020 .......... B41J 2/14233

(Continued)

OTHER PUBLICATIONS

Extended European Search Report in Europe Application No. 23214566.4, dated Apr. 23, 2024, 8 pages.

*Primary Examiner* — Kristal Feggins
(74) *Attorney, Agent, or Firm* — Crowell & Moring LLP

(57) ABSTRACT

There are provided a head chip, a liquid jet head, a liquid jet recording device, and a method of manufacturing the head chip each capable of achieving a reduction in size in a direction perpendicular to the ejection direction while ensuring the desired ejection performance. The head chip according to an aspect of the present disclosure includes a first ejection section, a jet hole plate arranged at a first side in a first direction of the first ejection section, a return plate which has a plurality of first communication channels configured to individually communicate a plurality of first jet channels and a plurality of first jet holes with each other, and which is arranged between the first ejection section and the jet hole plate in the first direction, and a flow channel plate which has a plurality of first connecting channels individually communicated with the plurality of first communication channels to constitute first return channels together with the corresponding first communication channels, and a manifold communicated in a lump with the plurality of first connecting channels, and which is arranged at a second side in the third direction of the first ejection section.

8 Claims, 16 Drawing Sheets

(58) Field of Classification Search
CPC ...... B41J 2/17546; B41J 2/18; B41J 2/14201; B41J 2/14233; B41J 2002/14217; B41J 2002/1425
See application file for complete search history.

(56) References Cited

FOREIGN PATENT DOCUMENTS

| | | | |
|---|---|---|---|
| JP | 2009-056766 | A | 3/2009 |
| JP | 2015-509454 | A | 3/2015 |
| JP | 2017-109457 | A | 6/2017 |
| JP | 2018-202817 | A | 12/2018 |

* cited by examiner

HEAD CHIP, LIQUID JET HEAD, LIQUID JET RECORDING DEVICE, AND METHOD OF MANUFACTURING HEAD CHIP

RELATED APPLICATIONS

This application claims priority to Japanese Patent application No. JP2022-195605, filed on Dec. 7, 2022, the entire content of which is incorporated herein by reference.

BACKGROUND OF THE INVENTION

1. Field of the Invention

The present disclosure relates to a head chip, a liquid jet head, a liquid jet recording device, and a method of manufacturing a head chip.

2. Description of the Related Art

As an inkjet head installed in an inkjet printer, there has been known one equipped with a circulation type head chip. As the circulation type head chip, there is disclosed a configuration provided with a plurality of pressure chambers for pressurizing ink, a plurality of nozzle holes individually communicated with the respective pressure chambers, a plurality of circulation paths individually disposed between the pressure chambers and the nozzle holes corresponding to each other, and a common flow channel to which the plurality of circulation paths is connected in a lump (see, e.g., JP2009-56766A, JP2015-509454A). The circulation paths extend in a direction crossing an arrangement direction of the nozzle holes out of directions perpendicular to an ejection direction of a liquid.

In the head chip of this kind, a part of the ink pressurized in the pressure chambers is ejected through the corresponding nozzle holes, while the rest of the ink flows into the common flow channel through the circulation paths.

Incidentally, in the circulation type head chip, in order to obtain a desired ejection performance, it is necessary to optimize power consumption in a pressure chamber and a flow channel resistance in the circulation path. It is possible to adjust the power consumption in the pressure chamber and the flow channel resistance in the circulation path by changing a dimension of the pressure chamber and a dimension of the circulation path.

However, in a conventional head chip, since the circulation path extends only in a direction perpendicular to the ejection direction, when supposedly attempting to elongate the circulation path, there is a possibility that growth in size of the head chip in a direction perpendicular to the ejection direction is caused.

The present disclosure provides a head chip, a liquid jet head, a liquid jet recording device, and a method of manufacturing the head chip each capable of achieving a reduction in size in a direction perpendicular to the ejection direction while ensuring the desired ejection performance.

SUMMARY OF THE INVENTION

In order to solve the problems described above, the present disclosure adopts the following aspects.

(1) A head chip according to an aspect of the present disclosure includes a first ejection section in which a plurality of first jet channels extending in a first direction is formed in a second direction crossing the first direction, a jet hole plate which has a plurality of first jet holes individually communicated with the plurality of first jet channels, and which is arranged at a first side in the first direction of the first ejection section, a return plate which has a plurality of first communication channels extending in a third direction crossing the second direction when viewed from the first direction, and individually communicating the plurality of first jet channels and the plurality of first jet holes with each other in a first side end part in the third direction, and which is arranged between the first ejection section and the jet hole plate in the first direction, and a flow channel plate which has a plurality of first connecting channels extending in the first direction, individually communicated with the plurality of first communication channels in second side end parts located at an opposite side to a first side in the third direction to constitute first return channels together with the corresponding first communication channels, and a manifold communicated in a lump with the plurality of first connecting channels, and which is arranged at a second side in the third direction with respect to the first ejection section.

According to the present aspect, a part of a liquid flowing from the first jet channel toward the jet hole flows into the manifold through the first return channel (the first communication channel and the first connecting channel). On this occasion, when adjusting the ejection performance of the head chip, it is possible to adjust the flow channel resistance of the first return channel by adjusting the dimension of the first connecting channel. Thus, it is possible to exert the desired jet performance while preventing the growth in size in a direction crossing the first direction compared to when adjusting the flow channel resistance of the first return channel by adjusting the dimension of the first communication channel in the direction crossing the first direction as in the related art.

(2) In the head chip according to the aspect (1) described above, it is preferable that a dimension in the first direction in the first connecting channel is larger than a dimension in the third direction in the first communication channel.

According to the present aspect, it is possible to prevent the growth in size of the head chip in the direction crossing the first direction compared to when the dimension in the third direction in the first communication channel is larger than the dimension in the first direction in the first connecting channel.

(3) In the head chip according to one of the aspects (1) and (2) described above, it is preferable that a flow channel cross-sectional area of the first connecting channel is larger in a connecting upstream opening as a connecting portion to the first communication channel than in a connecting downstream opening as a connecting portion to the manifold.

According to the present aspect, it is possible to make the liquid smoothly flow into the first connecting channel from the first communication channel. On this occasion, it becomes easy to discharge a bubble generated at, for example, an upstream side of the first connecting channel to the manifold through the first connecting channel. Thus, it is possible to prevent the bubble from being discharged outside through the first jet hole to perform high-accuracy printing.

Moreover, since the flow channel cross-sectional area of the first connecting channel is different between the upstream side and the downstream side, it is possible to adjust the flow channel cross-sectional area of the first connecting channel by adjusting the dimension in the first direction of the first connecting channel when adjusting the flow channel resistance of the first return channel. Thus, it is easy to ensure a room for the adjustment when adjusting the flow channel resistance of the first return channel.

(4) In the head chip according to the aspect (3) described above, it is preferable that the flow channel cross-sectional area of the first connecting channel gradually decreases in a direction from the connecting upstream opening toward the connecting downstream opening.

According to the present aspect, it is possible to gradually increasing the flow rate of the liquid in the direction from the connecting upstream opening toward the connecting downstream opening in the first connecting channel. Thus, it is possible to make the liquid more smoothly flow through the first connecting channel.

(5) In the head chip according to any of the aspects (1) through (4) described above, it is preferable that a dimension in the second direction is different between a communication downstream opening as a connecting portion of the first communication channel to the first connecting channel, and a connecting upstream opening as a connecting portion of the first connecting channel to the first communication channel.

According to the present aspect, the return plate and the flow channel plate are overlapped with each other so that one of the communication downstream opening and the connecting upstream opening smaller in dimension in the second direction falls within the range of the other of the openings larger in dimension in the second direction. Thus, it is possible to suppress the variation in communication area of the connecting upstream opening and the communication downstream opening between the first communication channels and between the first connecting channels due to the processing accuracy or the like compared to when setting the dimensions in the second direction of the connecting upstream opening and the communication downstream opening so as to be equivalent to each other. Thus, it is easy to stabilize the flow channel resistance in each of the return channels.

(6) In the head chip according to any of the aspects (1) through (5) described above, it is preferable that a second ejection section in which a plurality of second jet channels extending in the first direction is formed in the second direction, and which is arranged at an opposite side to the first ejection section with respect to the flow channel plate is further included, the jet hole plate is provided with a plurality of second jet holes individually communicated with the plurality of second jet channels, the return plate is provided with a plurality of second communication channels extending in the third direction, and individually communicating the plurality of second jet channels and the plurality of second jet holes with each other in the second side end part in the third direction, the flow channel plate is provided with a plurality of second connecting channels extending in the first direction, and individually communicated with the plurality of second communication channels in the first side end part in the third direction to constitute second return channels together with the second communication channels, the plurality of second connecting channels is communicated in a lump with the manifold, the plurality of first communication channels and the plurality of second communication channels are formed alternately in the second direction in the return plate, and the plurality of first connecting channels and the plurality of second connecting channels are formed alternately in the second direction in the flow channel plate.

According to the present aspect, it is possible to arrange the first communication channels and the second communication channels so as to overlap each other when viewed from the second direction, and arrange the first connecting channels and the second connecting channels so as to overlap each other when viewed from the second direction. Therefore, it is possible to achieve the reduction in size in the third direction of the head chip compared to when forming the first communication channels and the second communication channels at a distance in the third direction, and forming the first connecting channels and the second connecting channels at a distance in the third direction.

(7) A liquid jet head according to the present disclosure preferably includes the head chip according to any one of the aspects (1) through (6) described above.

According to the present aspect, it is possible to achieve the reduction in size in a direction crossing the first direction while ensuring the desired ejection performance.

(8) The liquid jet recording device according to the present disclosure includes the liquid jet head according to the aspect (7) described above.

According to the present aspect, it is possible to achieve the reduction in size in a direction crossing the first direction while ensuring the desired ejection performance.

(9) A method of manufacturing a head chip according to an aspect of the present disclosure is a method of manufacturing a head chip including an ejection section in which a plurality of jet channels extending in a first direction is formed in a second direction crossing the first direction, a jet hole plate which has a plurality of jet holes individually communicated with the plurality of jet channels, and which is arranged at a first side in the first direction of the ejection section, a return plate which has a plurality of communication channels extending in a third direction crossing the second direction when viewed from the first direction, and individually communicating the plurality of jet channels and the plurality of jet holes with each other in a first side end part in the third direction, and which is arranged between the ejection section and the jet hole plate in the first direction, and a flow channel plate which has a plurality of connecting channels extending in the first direction, individually communicated with the plurality of communication channels in second side end parts located at an opposite side to a first side in the third direction to constitute return channels together with the corresponding communication channels, and a manifold communicated in a lump with the plurality of connecting channels, and which is arranged at a second side in the third direction with respect to the ejection section, the method including a first overlapping step of overlapping the ejection section and the flow channel plate with each other in the third direction, a second overlapping step of overlapping the return plate with the ejection section and the flow channel plate from one side in the first direction, a third overlapping step of overlapping the jet hole plate with the return plate from the one side in the first direction, and an adjusting step of adjusting a dimension of the connecting channel prior to the second overlapping step to adjust a flow channel resistance in the connecting channel.

(10) In the method of manufacturing the head chip according to the aspect (9) described above, it is preferable that in the adjusting step, cutting processing is performed on an end surface facing to the first direction of the flow channel plate to thereby adjust a length in the first direction in the connecting channel.

According to the present aspect, it is possible to easily make the current parameter closer to the ideal parameter of the head chip with which the desired ejection performance can be exerted.

According to an aspect of the present disclosure, it is possible to achieve the reduction in size in a direction perpendicular to the ejection direction while ensuring the desired ejection performance.

DETAILED DESCRIPTION OF THE PREFERRED EMBODIMENTS

Figure 1:
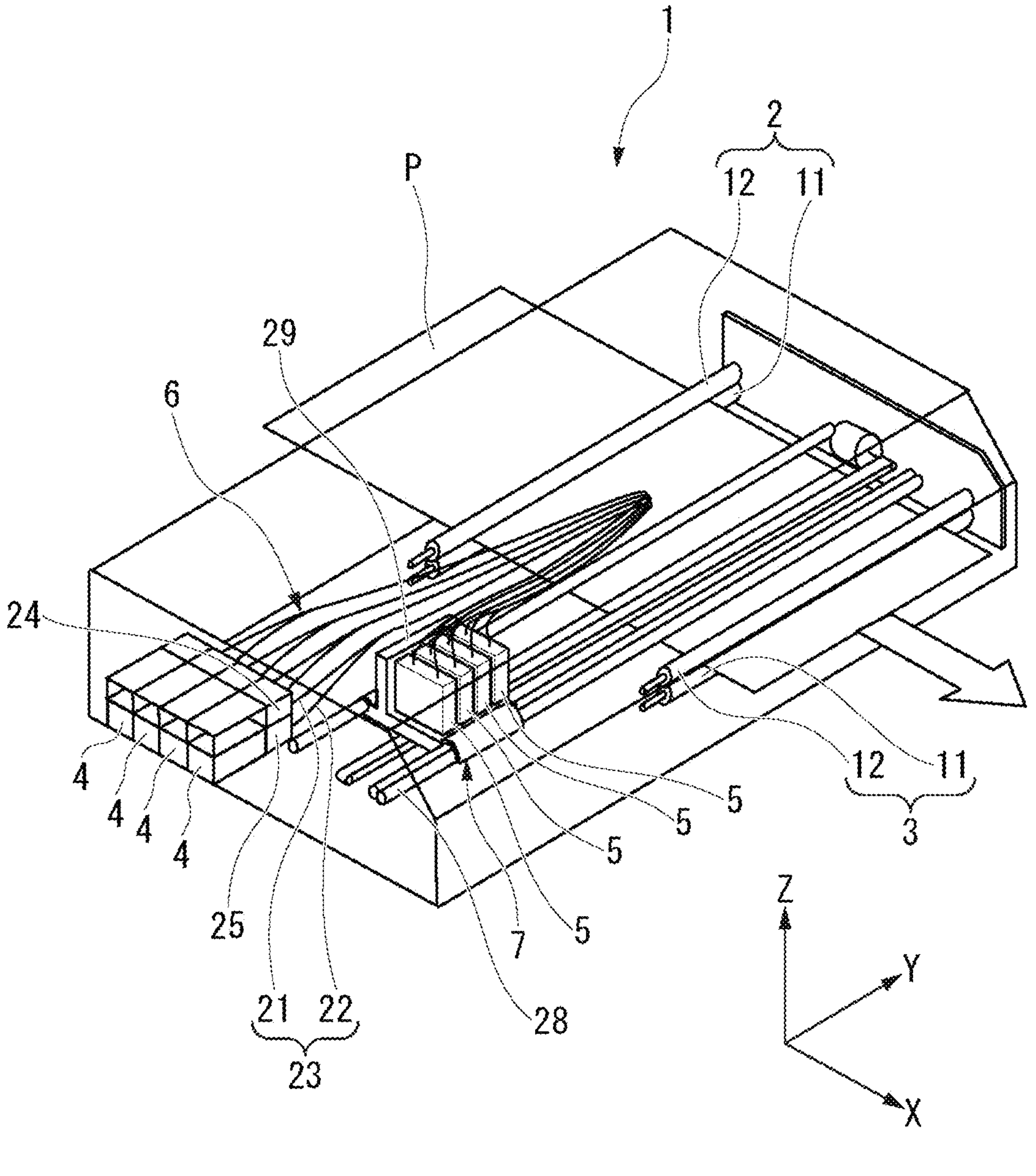
FIG. 1 is a schematic configuration diagram of a printer according to an embodiment.

An embodiment according to the present disclosure will hereinafter be described with reference to the drawings. In the embodiment and modified examples hereinafter described, constituents corresponding to each other are denoted by the same reference symbols, and the description thereof will be omitted in some cases. In the following description, expressions representing relative or absolute arrangements such as "parallel," "perpendicular," "center," and "coaxial" not only represent strictly such arrangements, but also represent the state of being relatively displaced with a tolerance, or an angle or a distance to the extent that the same function can be obtained. In the following embodiment, the description will be presented citing an inkjet printer (hereinafter simply referred to as a printer) for performing recording on a recording target medium using ink (a liquid) as an example. The scale size of each member is arbitrarily modified so as to provide a recognizable size to the member in the drawings used in the following description.

[Printer 1]

FIG. 1 is a schematic configuration diagram of a printer 1.

As shown in FIG. 1, the printer (a liquid jet recording device) 1 according to the present embodiment is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present embodiment, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain ink of four colors such as yellow, magenta, cyan, and black. The inkjet heads 5 are configured so as to be able to respectively eject the four colors of ink, namely the yellow ink, the magenta ink, the cyan ink, and the black ink according to the ink tanks 4 coupled thereto. It should be noted that water-based ink (electrically-conductive ink) using water as a solvent can be used as the ink contained in the ink tanks 4.

Figure 2:
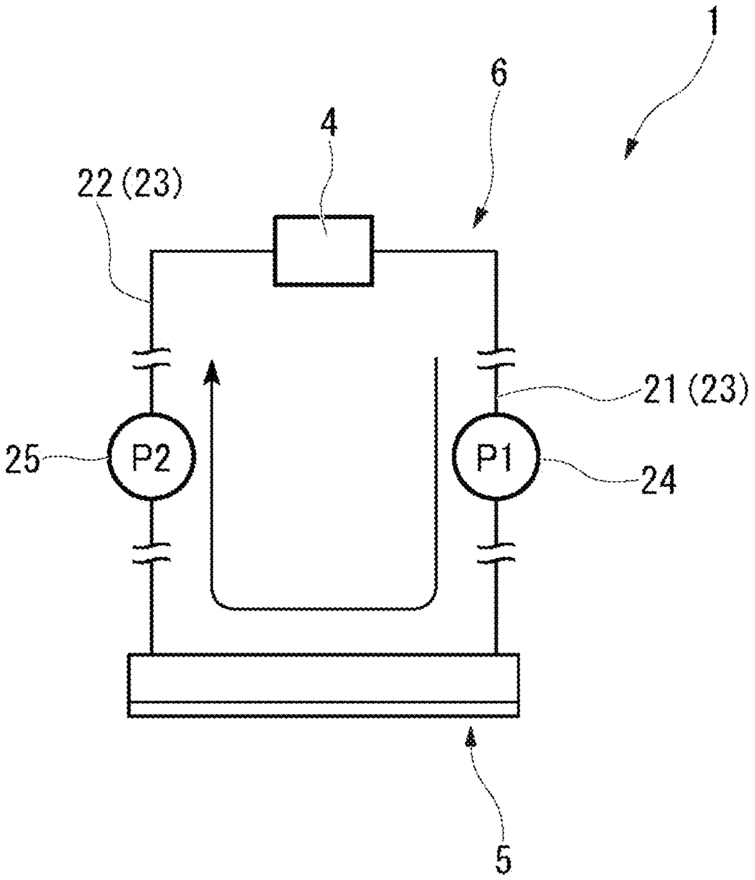
FIG. 2 is a schematic configuration diagram of an inkjet head and an ink circulation mechanism according to the embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the inkjet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the inkjet head 5. It is arranged that the ink can circulate between the inkjet head 5 and the ink tank 4 through the circulation flow channel 23 by driving the pressure pump 24 and the suction pump 25.

The scanning mechanism 7 makes the inkjet heads 5 perform a reciprocal scan in the Y direction. The scanning mechanism 7 is provided with a guide rail 28 extending in the Y direction, and a carriage 29 movably supported by the guide rail 28.

<Inkjet Heads 5>

As shown in FIG. 1, the inkjet heads 5 are mounted on the carriage 29. In the illustrated example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a control section (not shown) for applying a drive voltage to the head chip 50.

<Head Chip 50>

Figure 3:
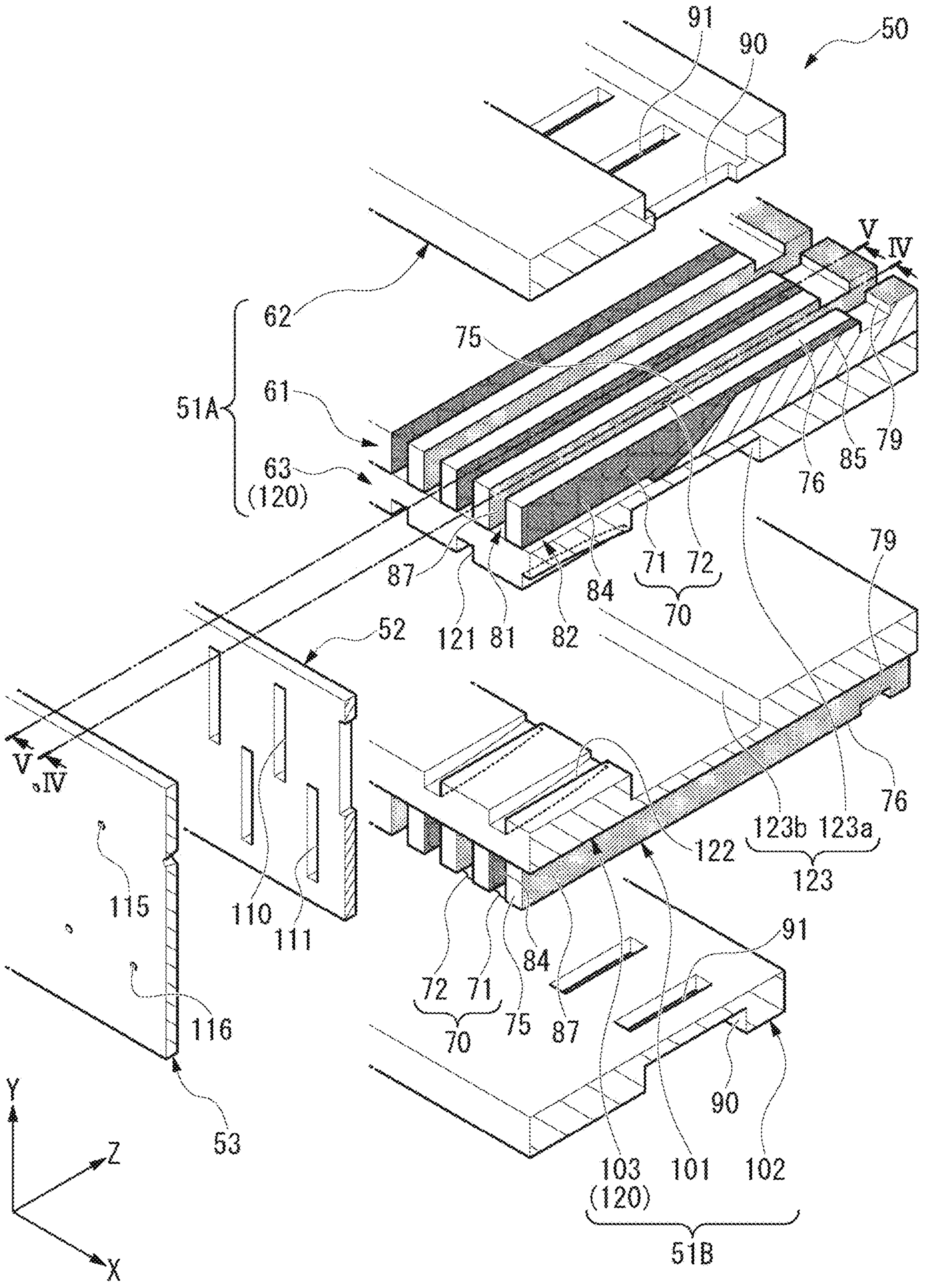
FIG. 3 is an exploded perspective view of a head chip according to the embodiment.
Figure 4:
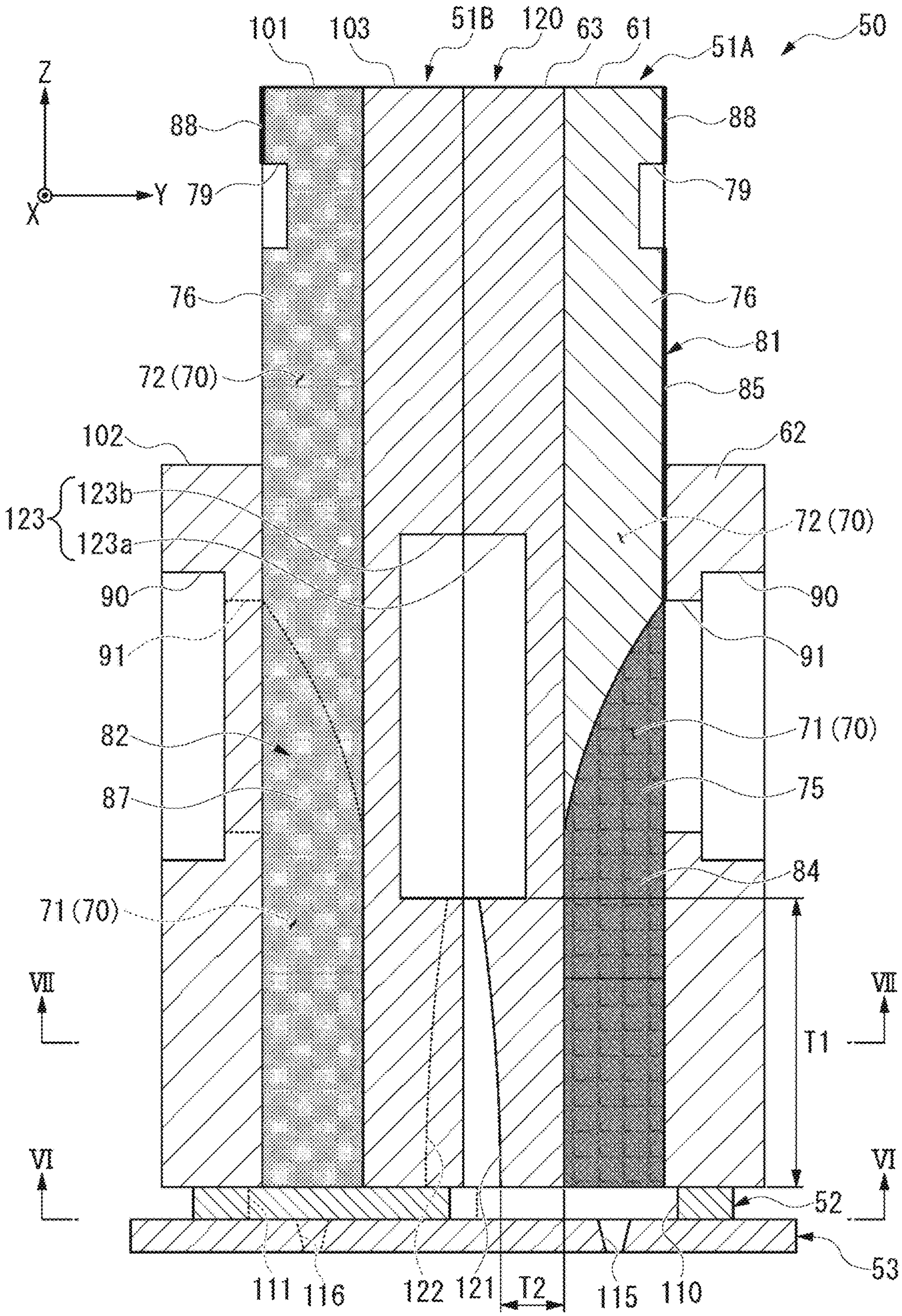
FIG. 4 is a cross-sectional view corresponding to the line IV-IV shown in FIG. 3.
Figure 5:
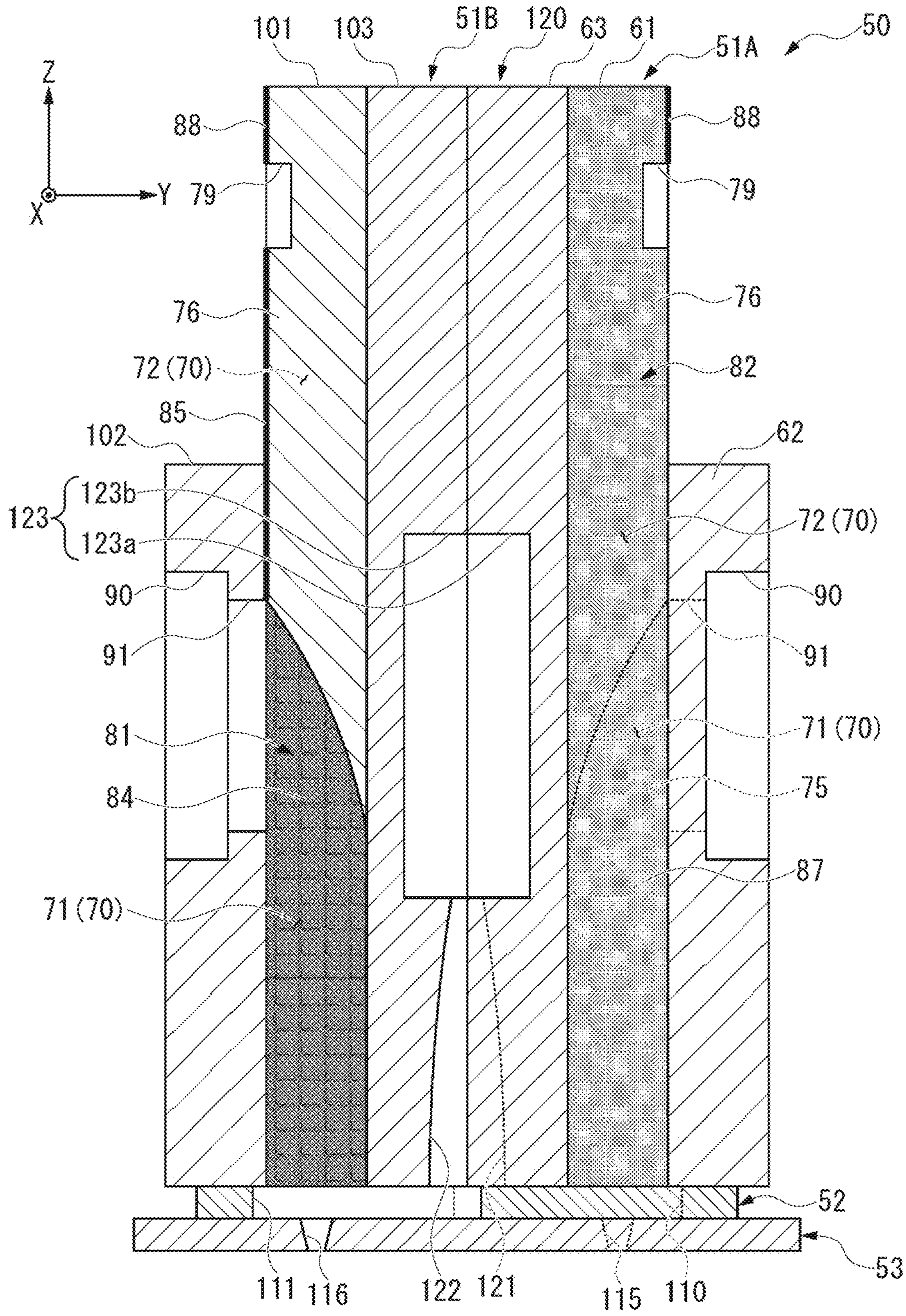
FIG. 5 is a cross-sectional view corresponding to the line V-V shown in FIG. 3.

FIG. 3 is an exploded perspective view of the head chip 50. FIG. 4 is a cross-sectional view along the line IV-IV shown in FIG. 3. FIG. 5 is a cross-sectional view along the line V-V shown in FIG. 3.

As shown in FIG. 3 through FIG. 5, the head chip 50 is of a circulation type (a vertical circulation type) which circulates the ink with the ink tank 4 out of so-called edge-shoot types which eject the ink from a tip portion in a channel extension direction (the Z direction) in each of ejection channels 71 described later.

The head chip 50 is provided with a first chip module 51A, a second chip module 51B, a return plate 52, and a nozzle plate (a jet hole plate) 53. In the following explanation, a configuration of each of the chip modules 51A, 51B will be described citing the first chip module 51A as an example. Therefore, the constituents in the second chip module 51B substantially the same as those of the first chip module 51A are denoted by the same reference symbols as in the first chip module 51A, and the description thereof will be omitted in some cases.

<First Chip Module 51A>

The first chip module 51A is provided with a first actuator plate 61, a first cover plate 62, and a first back plate 63. In the following explanation, the first chip module 51A will be described defining the +Y side as an obverse surface side, and the −Y side as a reverse surface side. It should be noted that the first ejection section is constituted by the first actuator plate 61 and the first cover plate 62.

The first actuator plate 61 is formed of a laminated substrate (a so-called chevron type) having two piezoelectric substrates which are different in polarization direction along the thickness direction (the Y direction (a third direction)) from each other, and are stacked on one another. It should be noted that as the piezoelectric substrates, there is preferably used a ceramics substrate formed of, for example, PZT (lead zirconate titanate). It should be noted that the first actuator plate 61 can be formed of a single piezoelectric substrate in which the polarization direction is set in a single direction (a so-called monopole type).

The first actuator plate 61 is provided with the ejection channels (first jet channels, jet channels) 71 each filled with the ink, and non-ejection channels 72 not filled with the ink. The channels 71, 72 are alternately arranged at intervals in the X direction (a second direction) in the first actuator plate 61 to thereby form a channel array 70. The configuration in which the channel extension direction coincides with the Z direction (a first direction) will be described in the present embodiment, but the channel extension direction can cross the Z direction.

As shown in FIG. 3 and FIG. 4, the ejection channels 71 each have an upper end portion terminating within the first actuator plate 61, and a lower end portion opening on a lower end surface of the first actuator plate 61. An upper part of each of the ejection channels 71 gradually shallows in depth in the Y direction along the upward direction. In contrast, a lower part of each of the ejection channels 71 penetrates the first actuator plate 61 in the Y direction.

As shown in FIG. 3 and FIG. 5, the non-ejection channels 72 penetrate the first actuator plate 61 in the Y direction, and at the same time penetrate the first actuator plate 61 in the Z direction. The depth in the Y direction in the non-ejection channels 72 is uniform throughout the entire length in the Z direction.

In the first actuator plate 61, a portion located between each of the ejection channels 71 and corresponding one of the non-jet channels 72 constitutes a drive wall 75. Therefore, both sides in the X direction of the ejection channel 71 are surrounded by the pair of drive walls 75. In the first actuator plate 61, a portion located above the ejection channel 71 constitutes a tail part 76.

As shown in FIG. 3, the first actuator plate 61 is provided with common wiring lines 81 and individual wiring lines 82. Each of the wiring lines 81, 82 is formed by depositing an electrode material such as Ti/Au or Ni/Au using, for example, evaporation, sputtering, or plating.

As shown in FIG. 3 and FIG. 4, the common wiring lines 81 are each provided with a common electrode 84 and a common terminal 85.

The common electrode 84 is formed on inner side surfaces opposed to each other in the X direction out of the inner surfaces of the ejection channel 71. In the illustrated example, the common electrode 84 is formed throughout the entire area in the Y direction on the inner side surfaces of the ejection channel 71.

The common terminal 85 is formed on an obverse surface of the tail part 76. The common terminal 85 is disposed on the obverse surface of the tail part 76 so as to correspond to each of the ejection channels 71. Each of the common terminals 85 extends linearly in the Z direction above corresponding one of the ejection channels 71. A lower end portion in the common terminal 85 is connected to the common electrode 84.

As shown in FIG. 3 and FIG. 5, the individual wiring lines 82 are each provided with individual electrodes 87, and an individual terminal 88.

The individual electrodes 87 are each formed on one of the inner side surfaces opposed to each other in the X direction out of the inner surfaces of each of the non-ejection channels 72. In the illustrated example, the individual electrode 87 is formed throughout the entire area in the Y direction on the inner side surface of the non-ejection channel 72.

The individual terminal 88 is provided to a portion located above the common terminal 85 on the obverse surface of the tail part 76. The individual terminal 88 is formed to have a strip-like shape extending in the X direction. The individual terminal 88 connects the individual electrodes 87, which are opposed to each other in the X direction across the ejection channel 71, to each other at obverse surface side opening edges of the non-ejection channels 72 which are opposed to each other in the X direction across the ejection channel 71. In the tail part 76, a portion located between the common terminal 85 and the individual terminal 88 is provided with a partitioning groove 79. The partitioning groove 79 extends in the X direction in the tail part 76. The partitioning groove 79 separates the common terminal 85 and the individual terminal 88 from each other.

To the obverse surface of the tail part 76, there is pressure-bonded a flexible printed board (not shown). The flexible printed board is coupled to the common terminals 85 and the individual terminals 88 on the obverse surfaces of the tail parts 76. The flexible printed board couples the first chip module 51A and the control section to each other.

<First Cover Plate 62>

As shown in FIG. 3 through FIG. 5, the first cover plate 62 is bonded to the obverse surface of the first actuator plate 61. Specifically, the first cover plate 62 closes the obverse surface-side openings of the channels 71, 72 in a state of exposing the obverse surfaces of the tail parts 76. A lower end surface of the first cover plate 62 is arranged so as to be coplanar with the lower end surface of the first actuator plate 61.

In the first cover plate 62, at positions overlapping the upper parts of the ejection channels 71 when viewed from the Y direction, there is formed a common ink chamber 90. The common ink chamber 90 extends in the X direction with a length sufficient for straddling, for example, the channel array 70, and at the same time, opens on the obverse surface of the first cover plate 62. The common ink chamber 90 is indirectly connected to the ink supply tube 21 through an entrance port not shown.

In the common ink chamber 90, at the positions overlapping the respective ejection channels 71 viewed from the Y direction, there are formed slits 91. The slits 91 each communicate the upper part of corresponding one of the ejection channels 71 and the inside of the common ink chamber 90 with each other. Therefore, the common ink chamber 90 is communicated with the ejection channels 71 through the respective slits 90 on the one hand, but is not communicated with the non-ejection channels 72 on the other hand.

<First Back Plate 63>

The first back plate 63 is bonded to a reverse surface of the first actuator plate 61. The first back plate 63 has an equivalent outer shape to that of the first actuator plate 61 when viewed from the Y direction. The first back plate 63 is overlapped with the whole of the first actuator plate 61 when viewed from the Y direction. In other words, the first back plate 63 closes reverse surface-side openings of the channels 71, 72.

<Second Chip Module 51B>

The second chip module 51B is provided with a second actuator plate 101, a second cover plate 102, and a second back plate (a flow channel plate) 103. The second chip module 51B has the second back plate 103, the second actuator plate 101, and the second cover plate 102 overlapped in sequence from the +Y side toward the −Y side. The second chip module 51B is overlapped with the first chip module 51A in a state in which the obverse surface side (the −Y side) faces to an opposite side to the first chip module 51A. Specifically, the first chip module 51A and the second chip module 51B are integrated with each other by the reverse surfaces of the first back plate 63 and the second back plate 103 being bonded to each other. In this case, the lower end surfaces of the respective chip modules 51A, 51B are arranged so as to be coplanar with each other. It should be noted that the second ejection section is constituted by the second actuator plate 101 and the second cover plate 102.

The ejection channels (second jet channels) 71 and the non-ejection channels 72 of the second chip module 51B are arranged so as to be shifted as much as a half pitch with respect to the arrangement pitch of the ejection channels 71 and the non-ejection channels 72 of the first chip module 51A. In other words, the ejection channels 71 of the chip modules 51A, 51B, and the non-ejection channels 72 of the chip modules 51A, 51B are each arranged in a zigzag manner. In this case, the ejection channels 71 of the first chip module 51A and the non-ejection channels 72 of the second chip module 51B face each other in the Y direction, and the non-ejection channels 72 of the first chip module 51A and the ejection channels 71 of the second chip module 51B face each other in the Y direction. It should be noted that the pitch of the channels 71, 72 in each of the chip modules 51A, 51B can arbitrarily be changed.

<Return Plate 52>

The return plate 52 is bonded to the lower end surfaces of the respective chip modules 51A, 51B in a lump. The return plate 52 closes the lower end opening parts of the respective channels 71, 72. The return plate 52 is formed of, for example, polyimide. The return plate 52 is provided with a plurality of first communication channels 110 and a plurality of second communication channels 111.

Figure 6:
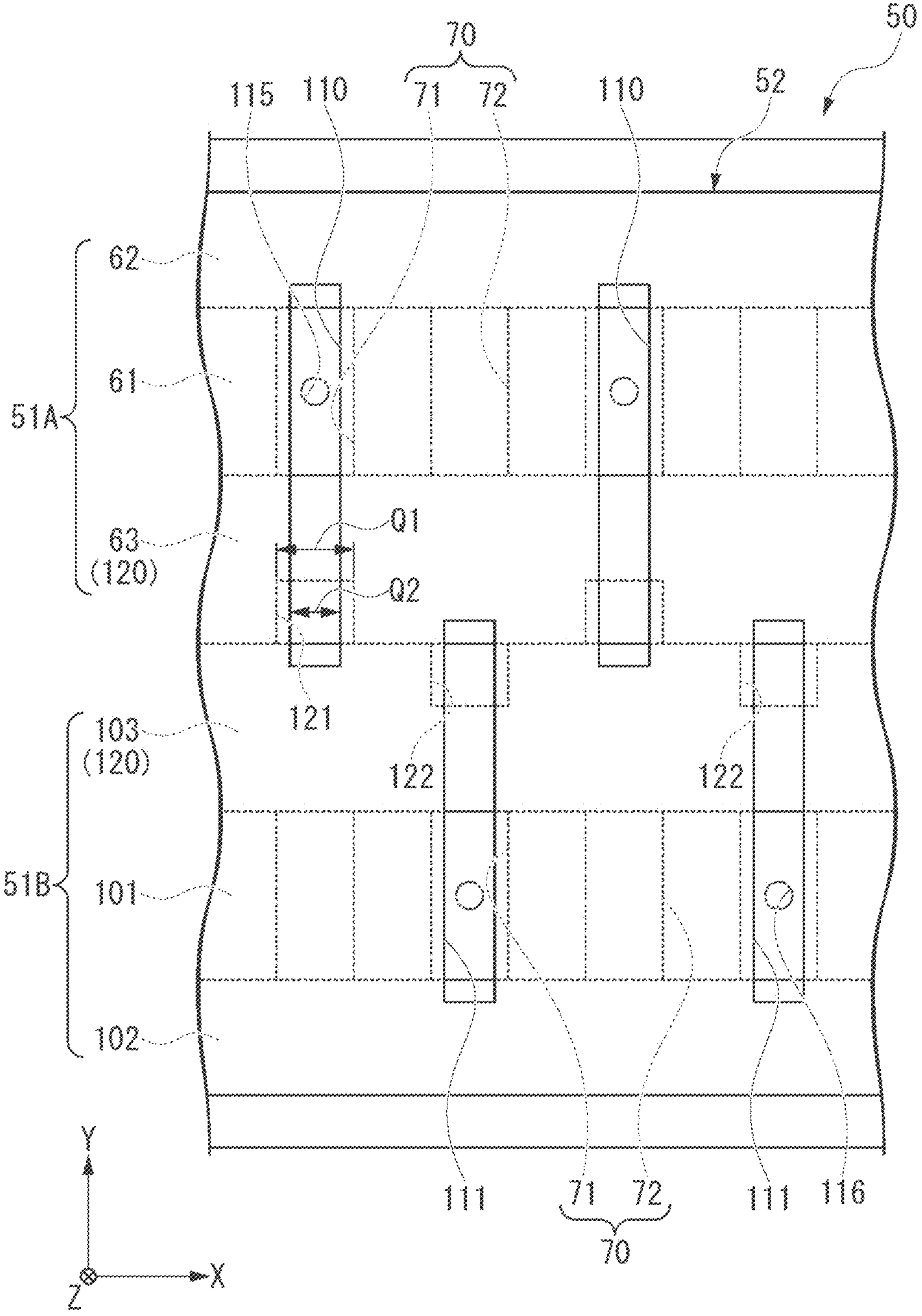
FIG. 6 is a cross-sectional view corresponding to the line VI-VI shown in FIG. 4.

FIG. 6 is a cross-sectional view corresponding to the line VI-VI shown in FIG. 4.

As shown in FIG. 4 through FIG. 6, the plurality of first communication channels 110 is formed individually at equivalent positions in the X direction to those of the respective ejection channels 71 in the first chip module 51A. In the present embodiment, the plurality of first communication channels 110 is formed at intervals in the X direction so as to correspond to the arrangement pitch of the ejection channels 71. Specifically, the first communication channels 110 each penetrate the return plate 52 in the Z direction, and at the same time, extend linearly in the Y direction. A +Y-side end part (a first side end part in the third direction) in the first communication channel 110 overlaps at least the ejection channel 71 when viewed from the Z direction. In other words, the first communication channels 110 are communicated with the ejection channels 71 of the first chip module 51A, respectively. In the illustrated example, the first communication channels 110 each overlap throughout the entire length in the Y direction in the first actuator plate 61 when viewed from the Z direction. It should be noted that the first communication channels 110 can each extend up to a position overlapping the first cover plate 62 when viewed from the Z direction.

A −Y-side end part (a second side end part in the third direction) in the first communication channel 110 overlaps the first back plate 63 when viewed from the Z direction. Specifically, the first communication channels 110 each extend throughout the entire length in the Y direction in the first back plate 63 when viewed from the Z direction. It should be noted that the first communication channels 110 can each extend up to a position overlapping the second back plate 103 when viewed from the Z direction.

The plurality of second communication channels 111 is formed individually at equivalent positions in the X direction to those of the respective ejection channels 71 in the second chip module 51B. In the present embodiment, the plurality of second communication channels 111 is formed at intervals in the X direction so as to correspond to the arrangement pitch of the ejection channels 71 of the second chip module 51B. Specifically, the first communication channels 110 and the second communication channels 111 are alternately arranged at intervals in the X direction. The second communication channels 111 each penetrate the return plate 52 in the Z direction, and at the same time, extend linearly in the Y direction. A −Y-side end part in the second communication channel 111 overlaps at least the ejection channel 71 when viewed from the Z direction. In other words, the second communication channels 111 are communicated with the ejection channels 71 of the second chip module 51B, respectively. In the illustrated example, the second communication channels 111 each overlap throughout the entire length in the Y direction in the second actuator plate 101 when viewed from the Z direction. It should be noted that the second communication channels 111 can each extend up to a position overlapping the second cover plate 102 when viewed from the Z direction.

A +Y-side end part in the second communication channel 111 overlaps the second back plate 103 when viewed from the Z direction. Specifically, the second communication channels 111 each extend throughout the entire length in the Y direction in the second back plate 103 when viewed from the Z direction. It should be noted that the second communication channels 111 can each extend up to a position overlapping the first back plate 63 when viewed from the Z direction.

A dimension in the X direction in the communication channels 110, 111 is made uniform throughout the entire length in the Y direction. The dimension in the X direction in the communication channels 110, 111 is smaller than the dimension in the X direction in the ejection channel 71. It should be noted that the dimension in the X direction in the communication channels 110, 111 can be no smaller than the dimension in the X direction in the ejection channel 71. It should be noted that the dimension in the X direction in the communication channels 110 can gradually change along the Y direction.

<Nozzle Plate 53>

As shown in FIG. 3 through FIG. 5, the nozzle plate 53 is bonded to the lower end surface of the return plate 52. A plurality of nozzle holes (first nozzle holes 115 and second nozzle holes 116) each penetrating the nozzle plate 53 in the Z direction is arranged in the nozzle plate 53.

In the nozzle plate 53, the plurality of first nozzle holes (jet holes) 115 is formed individually at positions overlapping the respective first communication channels 110 when viewed from the Z direction. In other words, the first nozzle holes 115 are arranged at intervals in the X direction at the same pitch as that of the first communication channels 110. The first nozzle holes 115 are communicated with the corresponding ejection channels 71 of the first chip module 51A through the corresponding first communication channels 110, respectively. Specifically, the first nozzle holes 115 are each formed at a position overlapping the ejection channel 71 and the first communication channel 110 when viewed from the Z direction in the +Y-side end part in corresponding one of the first communication channels 110. It should be noted that the first nozzle holes 115 can be communicated with the first communication channels 110 at positions shifted in the Y direction from the ejection channels 71 of the first chip module 51A, respectively.

In the nozzle plate 53, the plurality of second nozzle holes (jet holes) 116 is formed individually at positions overlapping the respective second communication channels 111 when viewed from the Z direction. In other words, the second nozzle holes 116 are arranged at intervals in the X direction at the same pitch as that of the second communication channels 111. The second nozzle holes 116 are communicated with the corresponding ejection channels 71 of the second chip module 51B through the corresponding second communication channels 111, respectively. Specifically, the second nozzle holes 116 are each formed at a position overlapping the ejection channel 71 and the second communication channel 111 when viewed from the Z direction in the −Y-side end part in corresponding one of the second communication channels 111. It should be noted that the second nozzle holes 116 can be communicated with the second communication channels 111 at positions shifted in the Y direction from the ejection channels 71 of the second chip module 51B, respectively.

Figure 7:
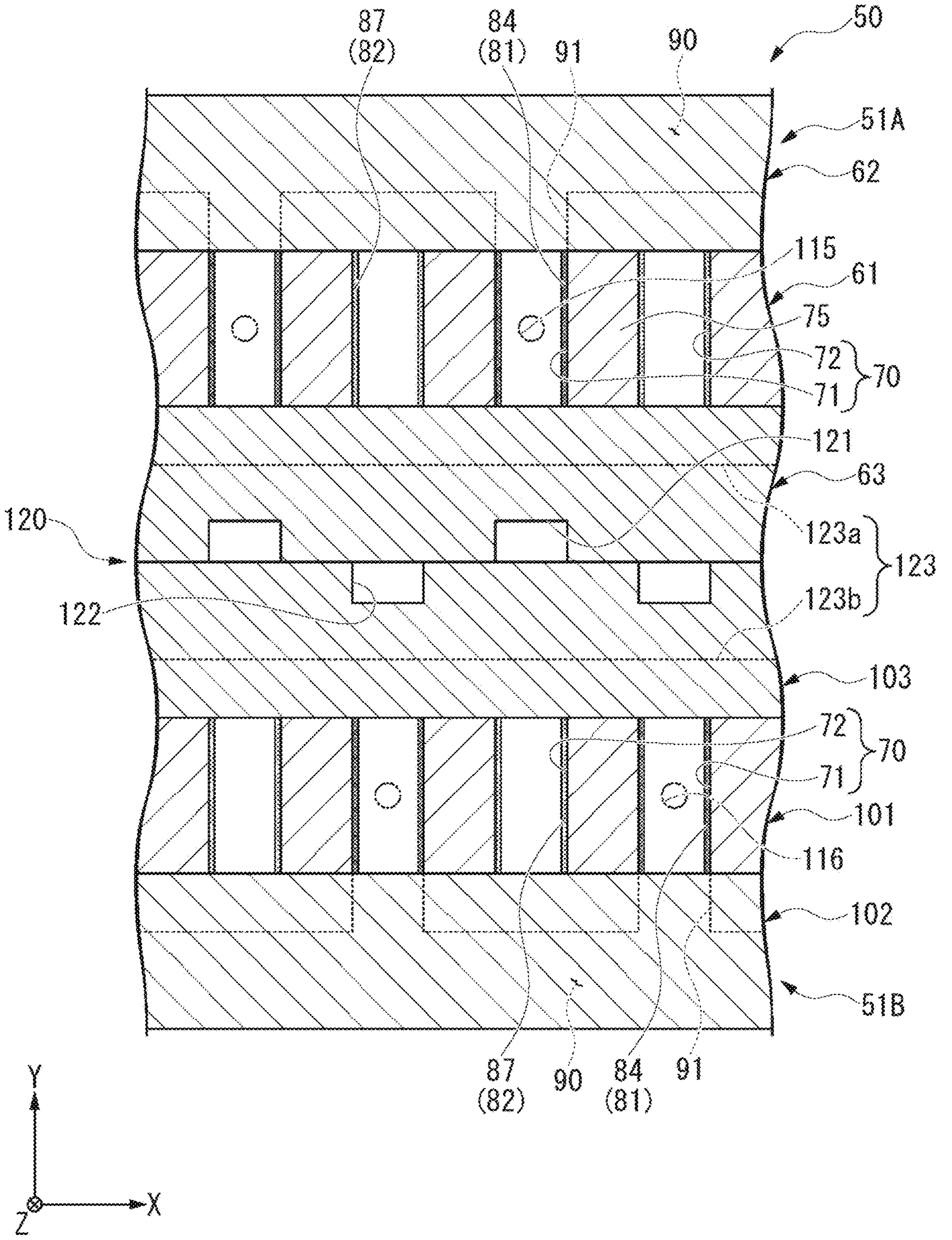
FIG. 7 is a cross-sectional view corresponding to the line VII-VII shown in FIG. 4.

FIG. 7 is a cross-sectional view corresponding to the line VII-VII shown in FIG. 4.

Here, as shown in FIG. 4, FIG. 5, and FIG. 7, the first back plate 63 and the second back plate 103 constitute a flow channel plate 120 in the present embodiment. The flow channel plate 120 is provided with a plurality of first connecting channels 121, a plurality of second connecting channels 122, and a manifold 123.

The plurality of first connecting channels 121 constitutes first return channels together with the corresponding first communication channels 110. The plurality of first connecting channels 121 is formed individually at positions overlapping the −Y-side end parts of the corresponding first communication channels 110 when viewed from the Z direction. The first connecting channels 121 are arranged at intervals in the X direction at the same pitch as that of the first communication channels 110. The first connecting channels 121 are each communicated with corresponding one of the first communication channels 110. Specifically, the first connecting channels 121 open on the reverse surface of the first back plate 63. The reverse surface-side openings in the first connecting channels 121 are closed by the second back plate 103.

The first connecting channels 121 each extend linearly in the Z direction when viewed from the Y direction. A lower end part in each of the first connecting channels 121 opens on the lower end surface of the first back plate 63. Thus, the lower end opening of each of the first connecting channels 121 is communicated with the first communication channel 110. In contrast, an upper end part in each of the first connecting channels 121 terminates in the first back plate 63. It is preferable for the upper end part of the first connecting channel 121 to be located below the upper end of the ejection channel 71, and is located at an equivalent height to the lower end edge of the slit 91 in the illustrated example. In the present embodiment, a dimension T1 (see FIG. 4) in the Z direction in the first connecting channel 121 is larger than a dimension T2 in the Y direction in the first communication channel 110. In the present embodiment, the dimension T2 of the first communication channel 110 means a distance between the lower end opening of the ejection channel 71 and the lower end opening of the first connecting channel 121. It should be noted that the dimension T1 in the Z direction in the first connecting channel 121 can be no larger than the dimension T2 in the Y direction in the first communication channel 110. it should be noted that the first connecting channel 121 can extend in a direction crossing the Z direction when viewed from the X direction, or can also extend along a curved line.

The lower end opening of the first connecting channel 121 is different in dimension in the X direction from a connecting portion (hereinafter referred to as a communication downstream opening) to the first connecting channel 121 in the −Y-side end part of the first communication channel 110. As shown in FIG. 6, a dimension Q1 in the X direction in the lower end opening of the first connecting channel 121 is larger than a dimension Q2 in the X direction in the communication downstream opening of the first communication channel 110. In this case, it is preferable for the communication downstream opening of the first communication channel 110 to fit into the inside in the Y direction with respect to the lower end opening of the first connecting channel 121 when viewed from the Z direction. It should be noted that the lower end opening in the first connecting channel 121 can be smaller in a dimension in X direction than the communication downstream opening of the first communication channel 110. It should be noted that in the illustrated example, the dimension Q2 of the communication downstream opening is equivalent to the dimension in the X direction in the first communication channel 110.

Further, the first connecting channel 121 gradually decreases in flow channel cross-sectional area (the cross-sectional area perpendicular to the Z direction) in a direction from the lower end opening (a connecting upstream opening) toward the upper end opening (a connecting downstream opening). Specifically, in each of the first connecting channels 121, the dimension in the Y direction gradually decreases in a direction from below to above. It should be noted that, in each of the first connecting channels 121, it is possible for the dimension in the X direction to gradually decrease in the direction from below to above. Further, it is possible for the flow channel cross-sectional area of each of the first connecting channels 121 to be uniform throughout the entire length in the Z direction.

The plurality of second connecting channels 122 constitutes second return channels together with the corresponding second communication channels 111. The plurality of second connecting channels 122 is formed individually at positions overlapping the +Y-side end parts of the respective second communication channels 111 when viewed from the Z direction. The second connecting channels 122 are arranged at intervals in the X direction at the same pitch as that of the second communication channels 111. Specifically, the first communication channels 121 and the second communication channels 122 are alternately arranged in the X direction.

The second connecting channels 122 are each communicated with corresponding one of the second communication channels 111. Specifically, the second connecting channels 122 open on the reverse surface (a surface facing to the +Y side) of the second back plate 103. The reverse surface side openings in the second connecting channels 122 are closed by the first back plate 63. The second connecting channels 122 extend in the Z direction. A lower end part in each of the second connecting channels 122 opens on the lower end surface of the second back plate 103. Thus, the lower end opening of each of the second connecting channels 122 is communicated with the second communication channel 111. In contrast, an upper end part in each of the second connecting channels 122 terminates in the second back plate 103. It should be noted that it is possible to set the dimensions and so on of the second connecting channels 122 to substantially the same as those of the first connecting channels 121.

The manifold 123 is provided to a portion located above the connecting channels 121, 122 in the flow channel plate 120. The manifold 123 is formed by overlapping a first recessed part 123*a* provided to the first back plate 63 and a second recessed part 123*b* provided to the second back plate 103 each other. The first recessed part 123*a* is a recessed part which opens on the reverse surface of the first back plate 63, and which extends in the Z direction and the Y direction. The second recessed part 123*b* is a recessed part which opens on the reverse surface of the second back plate 103, and which extends in the Z direction and the Y direction. The manifold 123 is formed by communicating the reverse surface side openings of the first recessed part 123*a* and the second recessed part 123*b* with each other. It should be noted that in the illustrated example, the dimensions of the first recessed part 123*a* and the second recessed part 123*b* are equivalent to each other. It should be noted that the first recessed part 123*a* and the second recessed part 123*b* can be made different in dimensions from each other. Further, the manifold 123 can be provided with a configuration in which a recessed part provided to either one of the first back plate 63 and the second back plate 103 is closed by the reverse surface of the other of the back plates.

The connecting channels 121, 122 are communicated in a lump with the manifold 123. Specifically, the upper end opening of each of the first connecting channels 121 opens on the lower end surface of the first recessed part 123*a*. An upper end opening of each of the second connecting channels 122 opens on the lower end surface of the second recessed part 123*b*. It should be noted that the manifold 123 is indirectly connected to the ink discharge tube 22 through an exit port not shown.

[Operation Method of Printer 1]

Then, there will hereinafter be described a case when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12. By the carriage 29 moving in the Y direction at the same time as the conveyance of the recording target medium P, the inkjet heads 5 mounted on the carriage 29 reciprocate in the Y direction.

Here, the operation of each of the inkjet heads 5 will hereinafter be described in detail.

In such a vertically circulating type head chip 50 as in the present embodiment, first, by making the pressure pump 24 and the suction pump 25 shown in FIG. 2 operate, the ink is circulated in the circulation flow channel 23. In this case, the ink circulating through the ink supply tube 21 flows into the common ink chamber 90 of each of the chip modules 51A, 51B through the entrance port. The ink having flowed into the common ink chambers 90 is supplied to the inside of each of the ejection channels through the slit 91. The ink having flowed into the ejection channels 71 gathers in the manifold 123 through the communication channels 110, 111 and the connecting channels 121, 122, and is then discharged to the ink discharge tube 22 through the exit port. The ink discharged to the ink discharge tube 22 is returned to the ink tank 4, and is then supplied again to the ink supply tube 21. Thus, the ink is circulated between the inkjet head 5 and the ink tank 4.

Then, when the reciprocation is started by the carriage 29, the drive voltages are applied to the electrodes 84, 87 via the flexible boards. On this occasion, the drive voltage is applied between the electrodes 84, 87 by setting the individual electrode 87 at a drive potential Vdd, and the common electrode 84 at a reference potential GND. Then, a thickness shear deformation occurs in the two drive walls 75 partitioning the ejection channel 75, and the two drive walls 75 each deform so as to protrude toward the non-ejection channel 72. Specifically, the actuator plates 61, 101 each have two piezoelectric substrates on which the polarization treatment has been performed in the thickness direction (the Y direction), and which are stacked on one another, and therefore, by applying the drive voltage, the actuator plates 61, 101 each make a flexural deformation having a V-shape centering on an intermediate position in the Y direction in the drive walls 75. Thus, the ejection channel 71 deforms as if it bulges.

When the volume of the ejection channel 71 increases due to the deformation of the two drive walls 75, the ink in the common ink chamber 90 is induced into the ejection channel 71 through the slit 91. Then, the ink induced to the inside of the ejection channel 71 propagates to the inside of the ejection channel 71 as a pressure wave, and the drive voltage applied between the electrodes 84, 87 is set to zero at the timing at which the pressure wave reaches the nozzle hole 115, 116.

Thus, the drive walls 75 are restored, and the volume of the ejection channel 71 having once increased is restored to the original volume. Due to this operation, the internal pressure of the ejection channel 71 increases to pressurize the ink. As a result, it is possible to eject the ink from the nozzle hole 115, 116. On this occasion, the ink turns to an ink droplet having a droplet shape when passing through the nozzle hole 115, 116, and is then ejected. Thus, it is possible to record a character, an image, or the like on the recording target medium P as described above. In other words, in the head chip 50 according to the present embodiment, out of the ink flowing through each of the communication channels 110, 111, a part is ejected through corresponding one of the nozzle holes 115, 116, while the rest is returned to the manifold 123 through corresponding one of the connecting channels 121, 122.

[Method of Manufacturing Head Chip 50]

Figure 8:
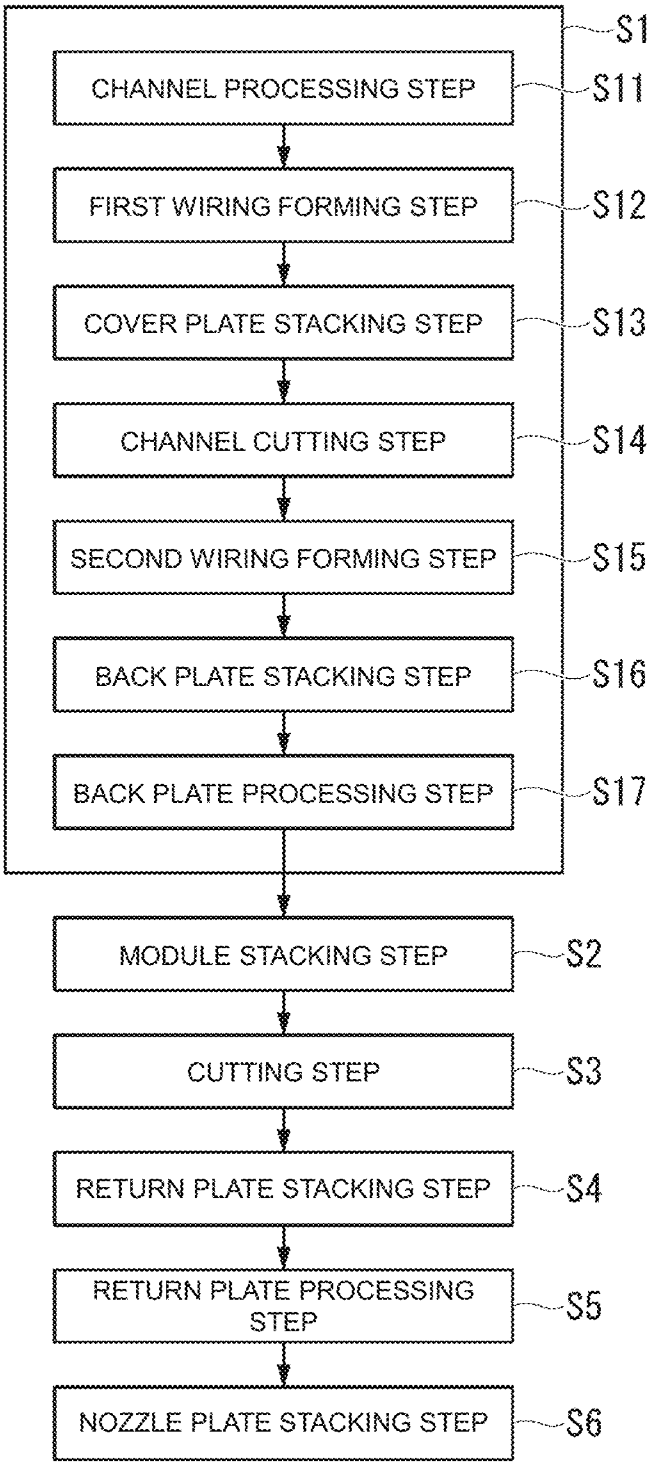
FIG. 8 is a flowchart for explaining a method of manufacturing the head chip according to the embodiment.

Then, a method of manufacturing the head chip 50 described above will be explained. FIG. 8 is a flowchart for explaining the method of manufacturing the head chip 50. FIG. 9 through FIG. 19 are each a process diagram for explaining the method of manufacturing the head chip 50. In the following description, there is described a case when manufacturing the head chip 50 chip by chip as an example for the sake of convenience.

As shown in FIG. 8, the method of manufacturing the head chip 50 is provided with a module forming step S1, a module stacking step S2, a cutting step S3, a return plate stacking step S4, a return plate processing step S5, and a nozzle plate stacking step S6.

In the module forming step S1, each of the first chip module 51A and the second chip module 51B is formed. The module forming step S1 is provided with a channel forming step S11, a first wiring forming step S12, a cover plate stacking step S13, a channel cutting step S14, a second wiring forming step S15, a back plate stacking step S16, and a back plate processing step S17. The chip modules 51A, 51B are respectively formed using substantially the same methods. Therefore, in the following description, the module forming step S1 is explained citing the first chip module 51A as an example.

Figure 9:
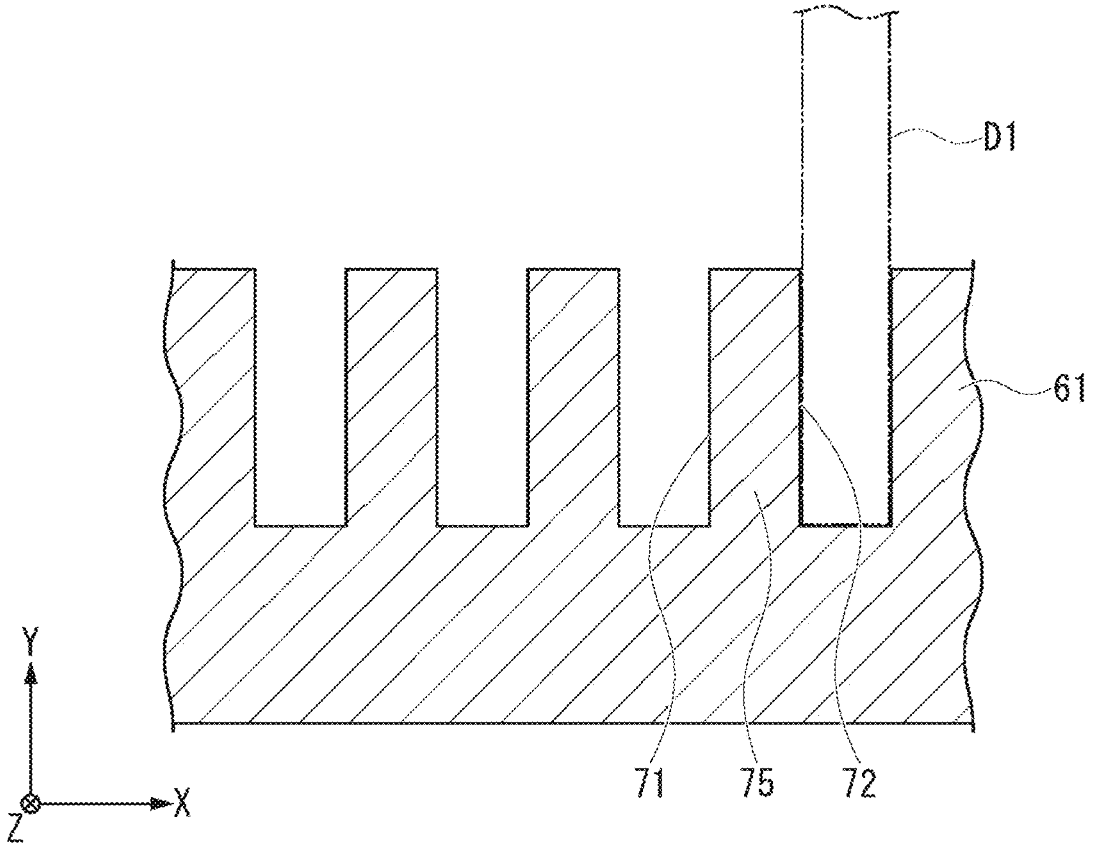
FIG. 9 is a process diagram for explaining the method of manufacturing the head chip according to the embodiment.

As shown in FIG. 9, in the channel forming step S11, formation areas of the ejection channels 71 and the non-ejection channels 72 in the first actuator plate 61 are processed with a dicer D1. The dicer D1 is formed to have a disk-like shape when viewed from the X direction. In the actuator plate processing step S11, in the formation areas of the non-ejection channels 72, a running amount in the Z direction of the dicer D1 is made larger than that in the formation areas of the ejection channels 71. Thus, the bottom surface of the ejection channel 71 is formed to have a circular arc shape convex downward, and the bottom surface of the non-ejection channel 72 is formed to have a linear shape when viewed from the X direction.

Figure 10:
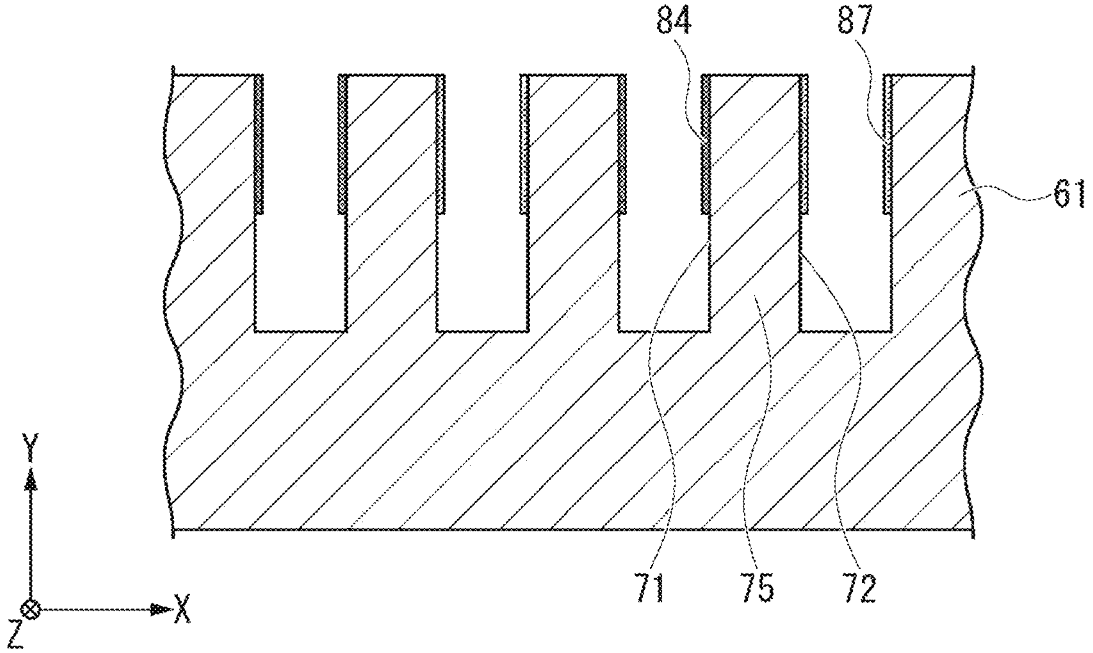
FIG. 10 is a process diagram for explaining the method of manufacturing the head chip according to the embodiment.

As shown in FIG. 10, in the first wiring forming step S12, an electrode material is deposited by performing an oblique vapor deposition or the like from an obverse surface side of the first actuator plate 61. Thus, the common terminals 85 and the individual terminals 88 are formed on the obverse surface of the first actuator plate 61, and at the same time, a part of each of the common electrodes 84 and the individual electrodes 87 is formed on the inner surface of each of the channels 71, 72.

Figure 11:
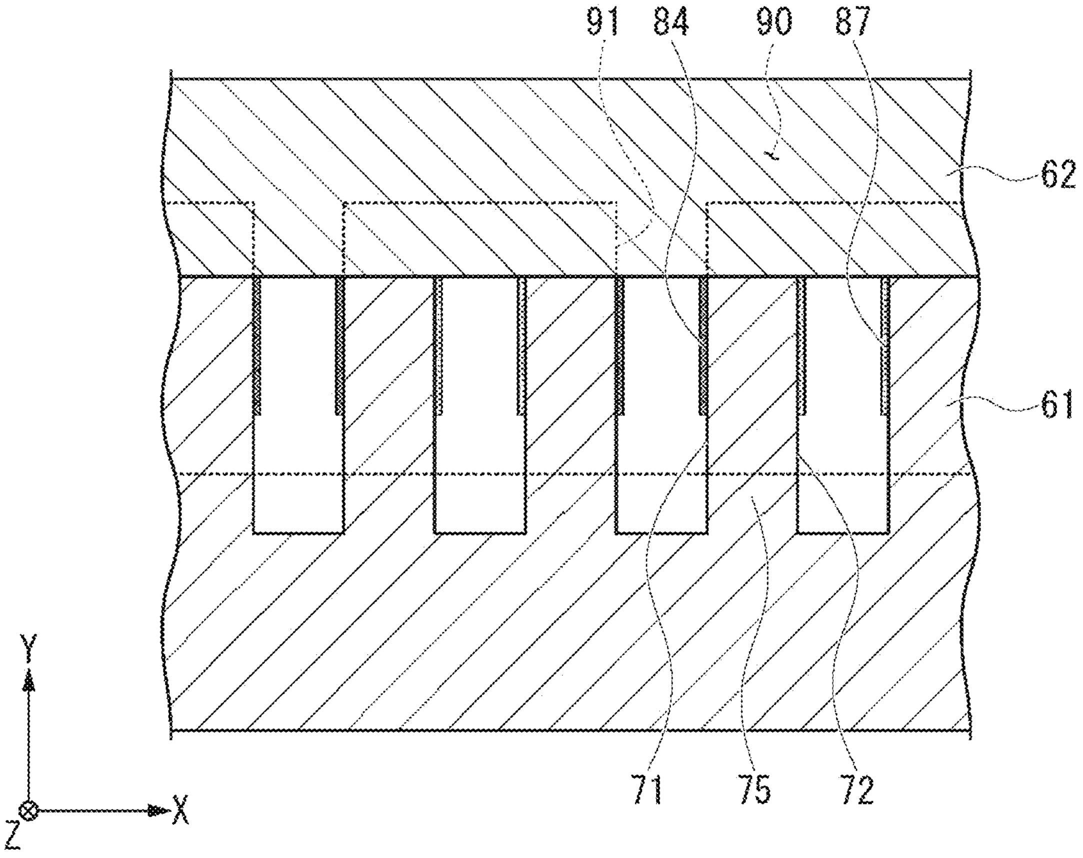
FIG. 11 is a process diagram for explaining the method of manufacturing the head chip according to the embodiment.

As shown in FIG. 11, in the cover plate stacking step S13, the first cover plate 62 is attached to the obverse surface of the first actuator plate 61.

Figure 12:
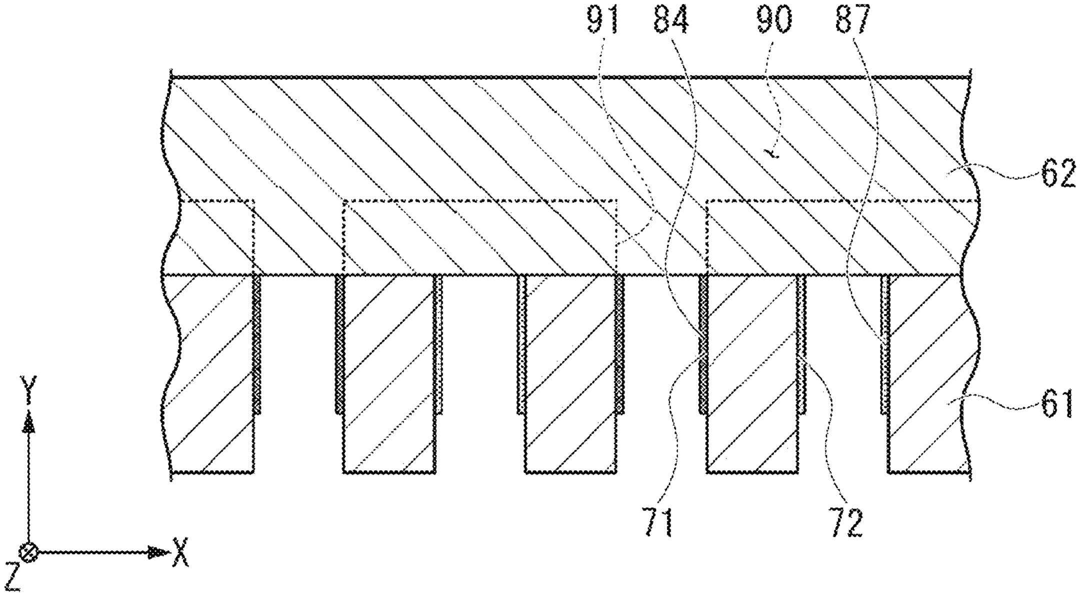
FIG. 12 is a process diagram for explaining the method of manufacturing the head chip according to the embodiment.

As shown in FIG. 12, in the channel cutting step S14, cutting processing is performed on the reverse surface of the first actuator plate 61. Specifically, the first actuator plate 61 is cut until the ejection channels 71 and the non-ejection channels 72 open on the reverse surface of the first actuator plate 61.

Figure 13:
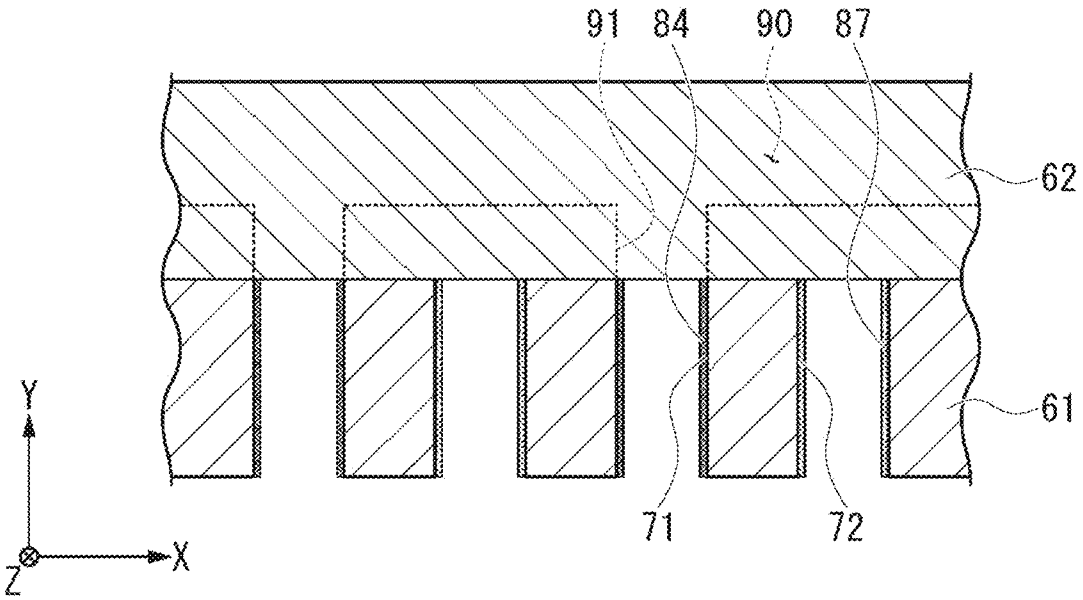
FIG. 13 is a process diagram for explaining the method of manufacturing the head chip according to the embodiment.

As shown in FIG. 13, in the second wiring forming step S15, the electrode material is deposited by performing an oblique vapor deposition or the like from a reverse surface side of the first actuator plate 61. Thus, a part of each of the common electrodes 84 and the individual electrodes 87 is formed on the inner surface of each of the channels 71, 72.

Figure 14:
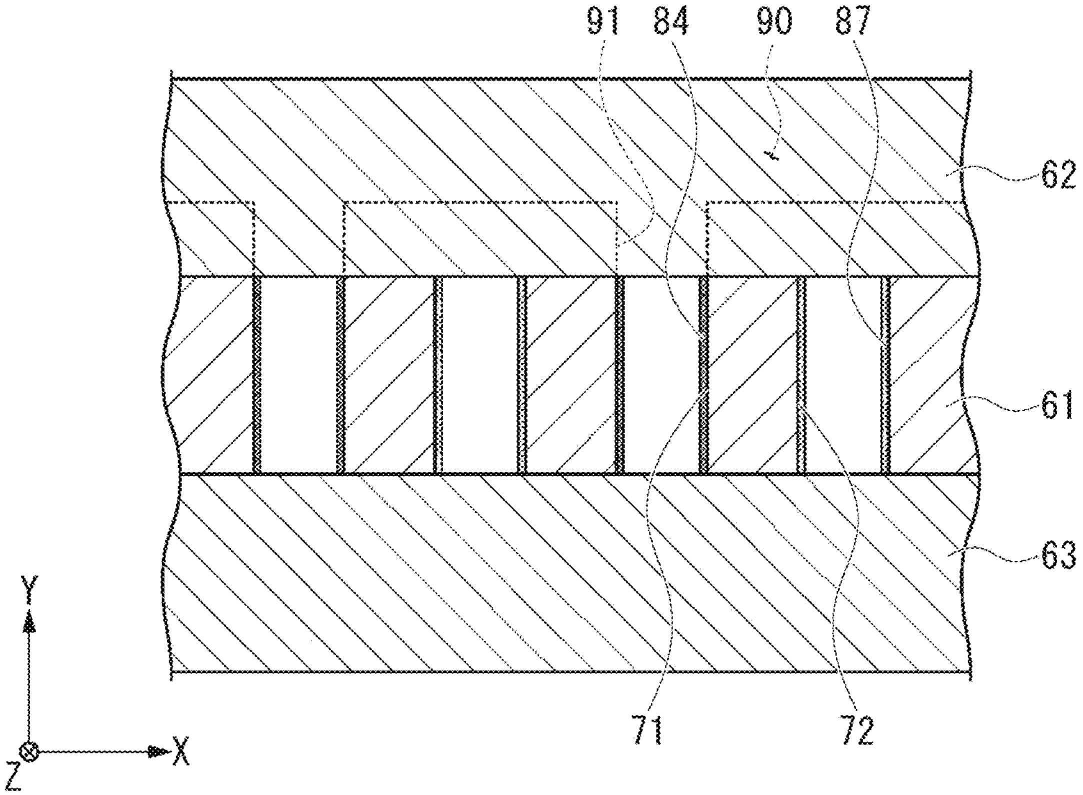
FIG. 14 is a process diagram for explaining the method of manufacturing the head chip according to the embodiment.

As shown in FIG. 14, in the back plate stacking step S16, the first back plate 63 is attached to the reverse surface of the first actuator plate 61.

Figure 15:
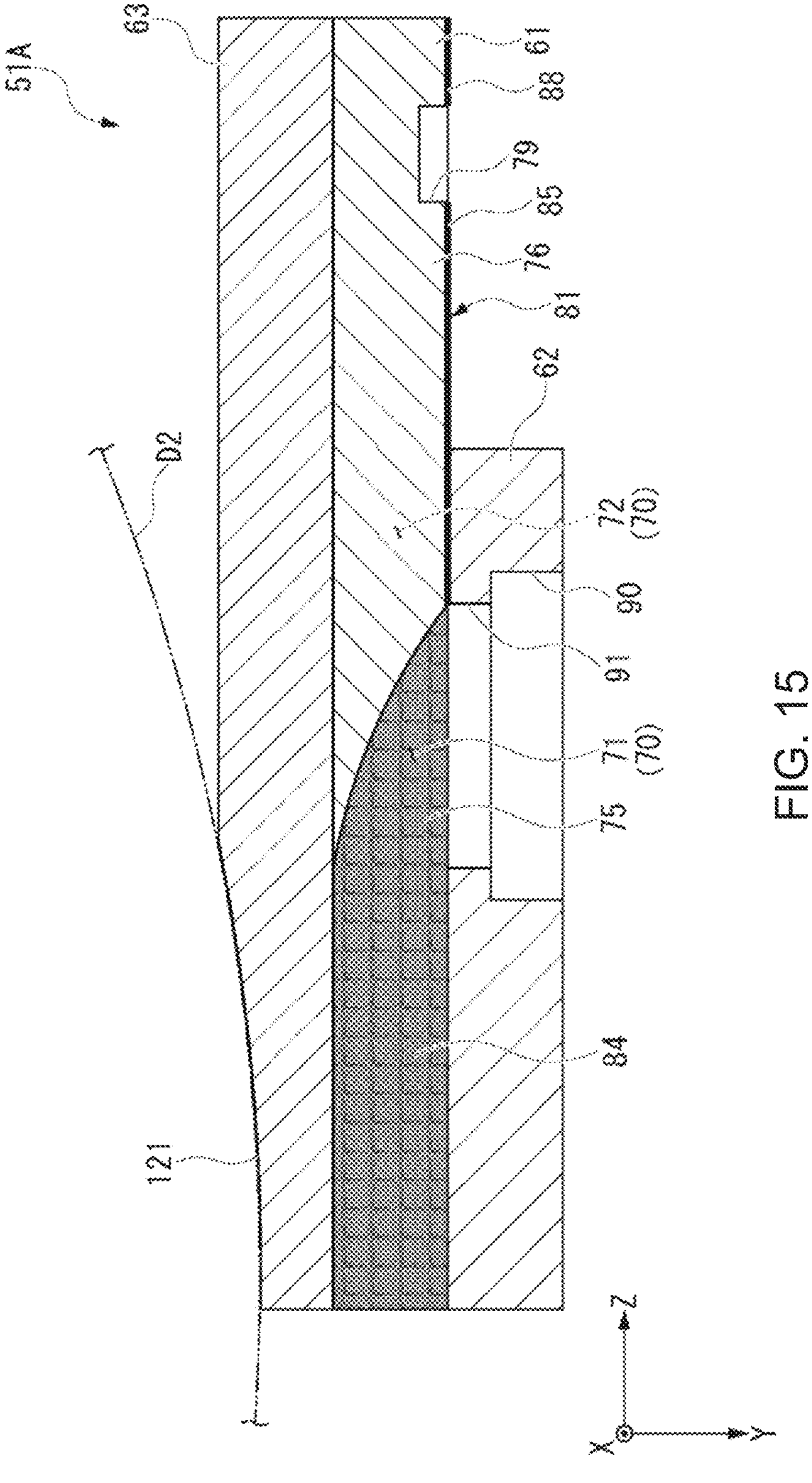
FIG. 15 is a process diagram for explaining the method of manufacturing the head chip according to the embodiment.
Figure 16:
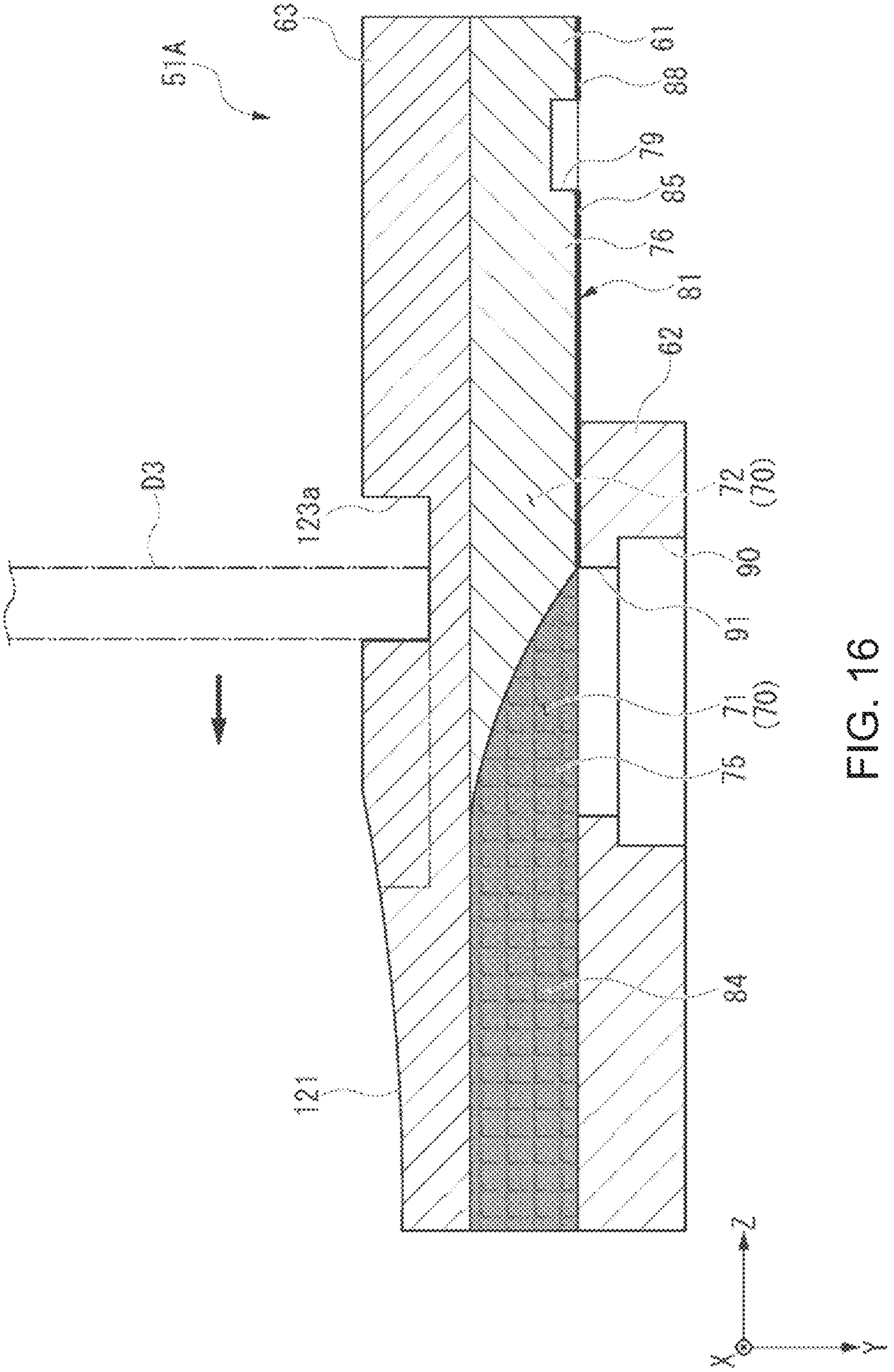
FIG. 16 is a process diagram for explaining the method of manufacturing the head chip according to the embodiment.

As shown in FIG. 15 and FIG. 16, in the back plate processing step S17, the first connecting channels 121 and the first recessed part 123*a* are provided to the first back plate 63. Specifically, as shown in FIG. 15, regarding the first connecting channels 121, formation areas of the first connecting channels 121 in the reverse surface of the first back plate 63 are processed using a dicer D2. On this occasion, by making the dicer D2 enter so that the axial line of the dicer D2 extends along the X direction, the first connecting channels 121 are each formed so that the dimension in the Y direction gradually decreases in a direction from below to above.

As shown in FIG. 16, regarding the first recessed part 123*a*, a formation area of the first recessed part 123*a* in the reverse surface of the first back plate 63 is processed using a dicer D3. On this occasion, by repeatedly making the dicer D3 enter the reverse surface of the first back plate 63 in the Y direction in the state of making the axial line of the dicer D3 parallel to the Z direction, the first recessed part 123*a* is gradually processed in the Z direction. Thus, the first chip module 51A is completed. It should be noted that by performing substantially the same method as the chip module forming step S1 described above on the second actuator plate 101 and so on, the second chip module 51B is formed.

Figure 17:
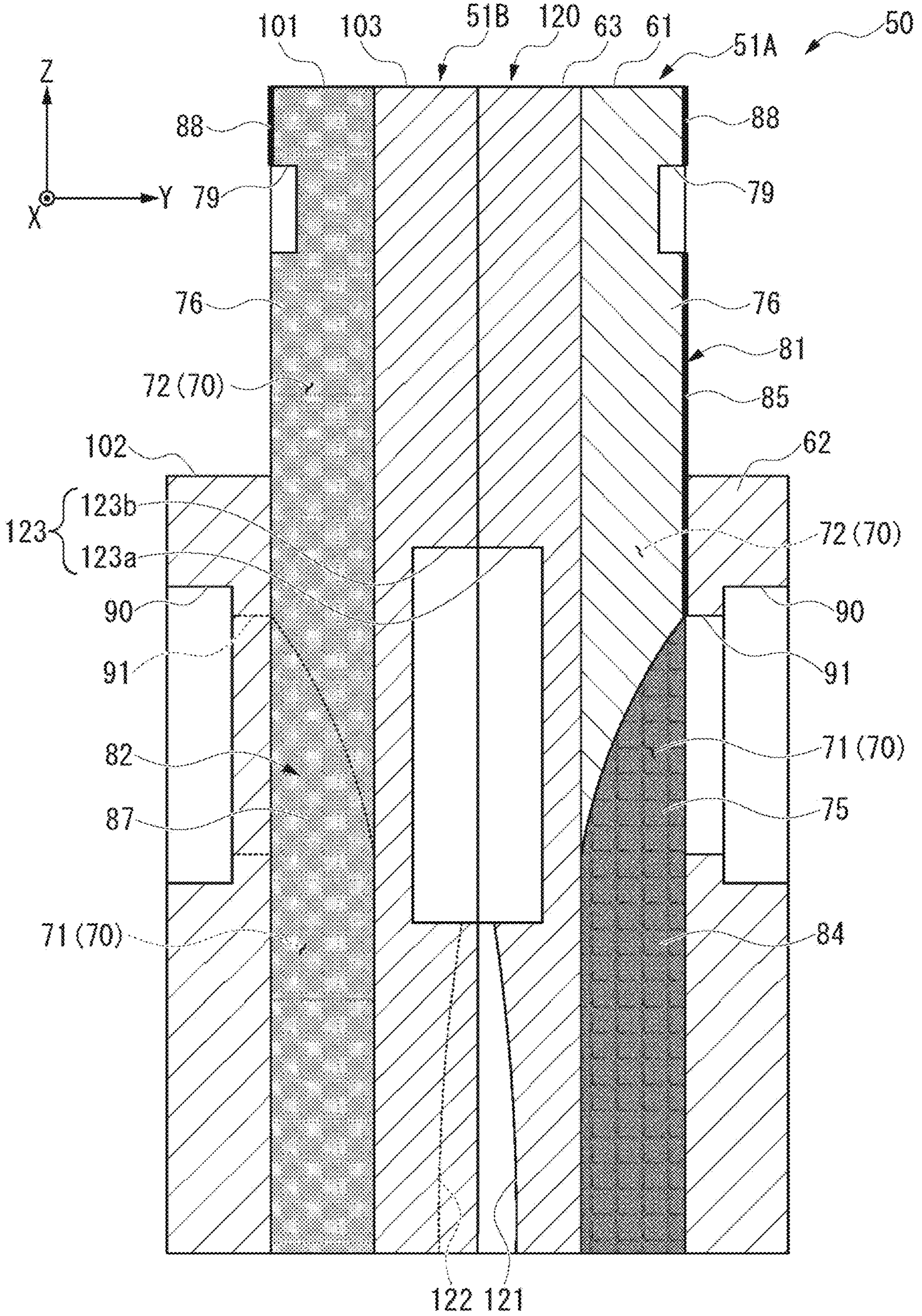
FIG. 17 is a process diagram for explaining the method of manufacturing the head chip according to the embodiment.

As shown in FIG. 17, in the module stacking step S3, the chip modules 51A, 51B formed in the chip module forming step S1 are bonded to each other. Specifically, the reverse surfaces of the back plates 63, 103 are bonded to each other in a state in which the lower end surfaces of the respective chip modules 51A, 51B coincide with each other. Thus, the reverse side openings of the first connecting channels 121 are closed by the second back plate 103, the reverse side openings of the second connecting channels 122 are closed by the first back plate 63, and at the same time, the manifold 123 is formed with the first recessed part 123*a* and the second recessed part 123*b*. Thus, the stacked body of the chip modules 51A, 51B is formed.

Figure 18:
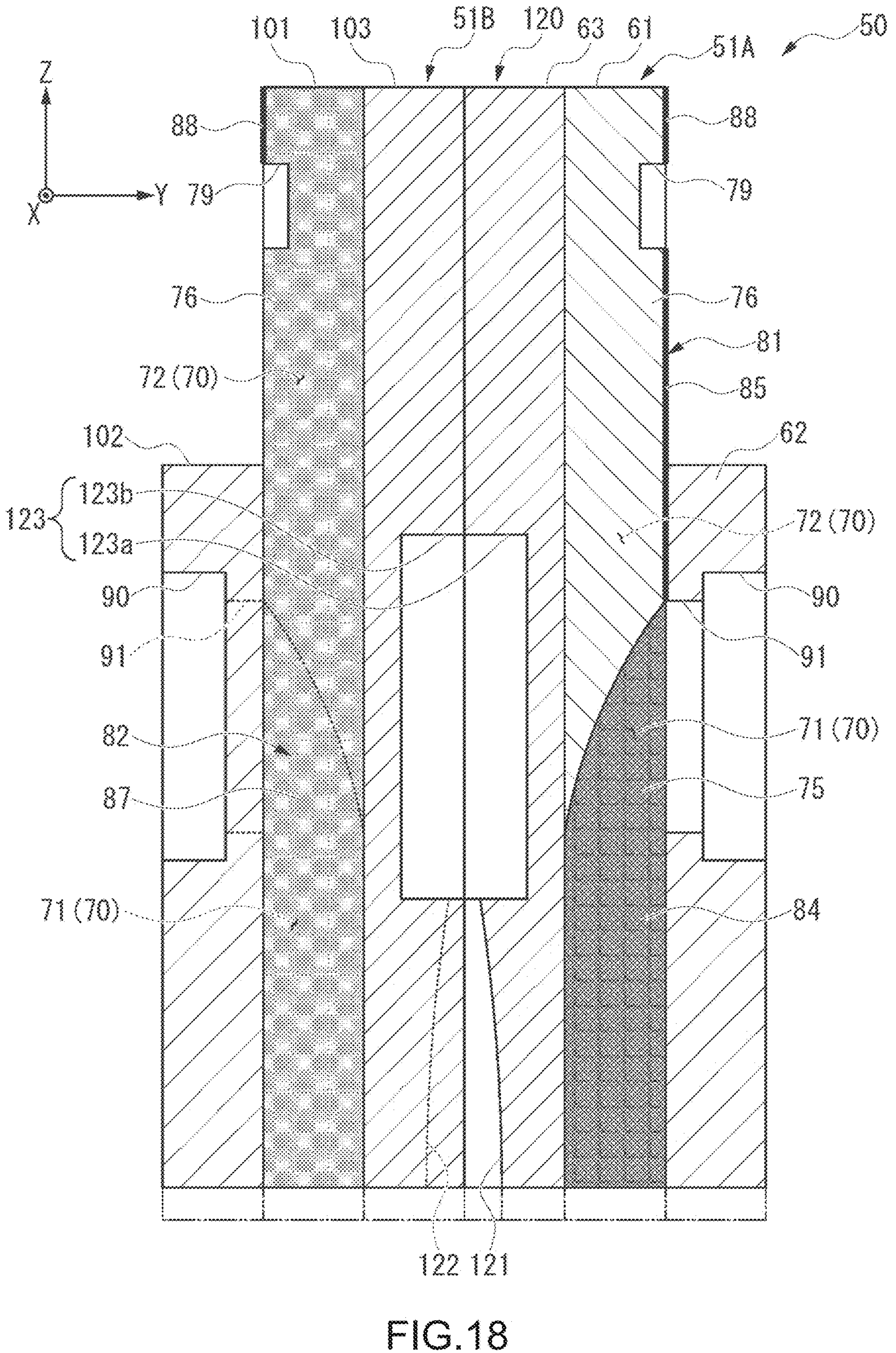
FIG. 18 is a process diagram for explaining the method of manufacturing the head chip according to the embodiment.

As shown in FIG. 18, the cutting step S4 is a kind of a so-called adjustment step for adjusting a parameter (a dimension) related to the ejection performance of the head chip 50. In the cutting step S4, by cutting the lower end surface of the stacked body of the chip modules 51A, 51B to adjust the flow channel length of the channel 71 and the connecting channels 121, 122, the power consumption and the flow channel resistance are adjusted. In the present embodiment, an ideal parameter of the head chip 50 with which the desired ejection performance can be exerted is obtained in advance using a simulation result or the like. Subsequently, a current parameter of a real machine on which the module stacking step S3 has been performed and the ideal parameter are compared with each other. Then, the lower end surface of the stacked body of the chip modules 51A, 51B is cut (see a chained line in FIG. 18) so that the current parameter falls within a predetermined range with respect to the ideal parameter. It should be noted that in the present embodiment, the connecting channels 121 are each formed so that the dimension in the Y direction gradually decreases in a direction from below to above. Therefore, as the cutting amount in the cutting step S4 increases, the flow channel resistance decreases.

Figure 19:
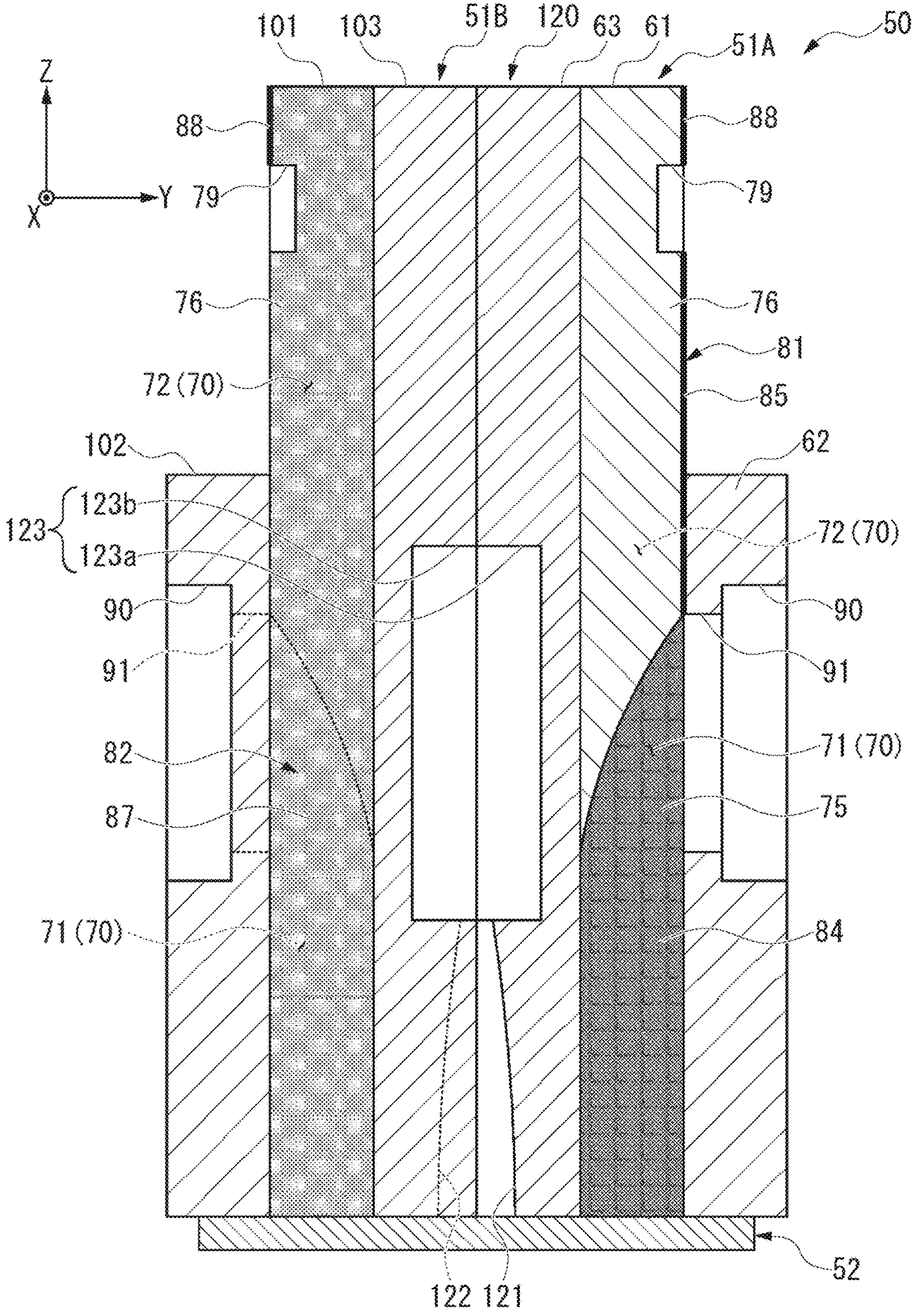
FIG. 19 is a process diagram for explaining the method of manufacturing the head chip according to the embodiment.

As shown in FIG. 19, in the return plate stacking step S5, the return plate 52 is bonded to a lower end surface in the stacked body of the chip modules 51A, 51B.

In the return plate processing step S6, the communication channels 110, 111 are provided to portions overlapping the ejection channels 71 when viewed from the Z direction of the return plate 52. It should be noted that the communication channels 110, 111 are formed by performing, for example, laser processing on the return plate 52.

In the nozzle plate stacking step S7, the nozzle plate 53 is bonded to the lower surface of the return plate 52.

Due to the steps described hereinabove, the head chip 50 is completed. It should be noted that when manufacturing the head chips 50 wafer by wafer, substantially the same step as the chip module forming step S1 described above is performed on an actuator plate wafer, a cover plate wafer, and a back plate wafer to thereby form a stacked body of the wafers. Subsequently, by segmentalizing the stacked body of the wafers, the plurality of chip modules 51A, 51B is taken out. Subsequently, by performing the module stacking step S3 and subsequent steps on the chip modules 51A, 51B thus taken out from the stacked body of the wafers, the head chips 50 are completed.

In the present embodiment, there is adopted the configuration in which the flow channel length of the channel 71 and the connecting channels 121, 122 is adjusted by cutting the lower end surface of the stacked body of the chip modules 51A, 51B in the cutting step S4 after the module stacking step S3, but this configuration is not a limitation. In the head chip 50 according to the present embodiment, it is sufficient that the dimension in the Z direction of the connecting channels 121, 122 can be adjusted prior to the return plate stacking step S5. In this case, it is possible to cut the end surface facing to the +Z side out of the inner surfaces of the recessed part 123*a*, 123*b* in, for example, the back plate processing step S17 shown in FIG. 16. In this case, by adjusting the dimension in the Z direction of the recessed parts 123*a*, 123*b*, it is possible to adjust the dimension (the distance between the lower end surfaces of the chip modules 51A, 51B and the end surfaces facing to the +Z direction out of the inner surfaces of the recessed parts 123*a*, 123*b*) in the Z direction of the connecting channels 121, 122 as a result. In this case, the back plate processing step S17 becomes a kind of the adjusting step.

As described above, the head chip 50 according to the present embodiment is made to have the configuration in which the plurality of first connecting channels 121 which is individually connected to the first communication channels 110, and which constitutes the first return channels together with the corresponding first communication channels 110 is provided between the plurality of first communication channels 110 and the manifold 123.

According to this configuration, a part of the ink flowing from the ejection channel 71 toward the nozzle hole 115 flows into the manifold 123 through the first return channel (the first communication channel 110 and the first connecting channel 121). On this occasion, when adjusting the ejection performance of the head chip 50, it is possible to adjust the flow channel resistance of the first return channel by adjusting the dimension of the first connecting channel 121. Thus, it is possible to exert the desired ejection performance while preventing the growth in size of the head chip 50 in a direction crossing the Z direction compared to when adjusting the flow channel resistance of the first return channel by adjusting the dimension of the first communication channel 110 in the direction crossing the Z direction as in the related art.

In the head chip 50 according to the present embodiment, by performing the cutting processing on the lower end surfaces of the chip modules 51A, 51B after the module stacking step S3, it is possible to adjust the dimensions in the Z direction of the first connecting channels 121 and the second connecting channels 122. Thus, it is possible to easily make the current parameter closer to the ideal parameter of the head chip 50 with which the desired ejection performance can be exerted.

In the head chip 50 according to the present embodiment, there is adopted the configuration in which the dimension in the Z direction in the first connecting channel 121 is larger than the dimension in the Y direction in the first communication channel 110.

According to this configuration, it is possible to prevent the growth in size of the head chip 50 in the direction crossing the Z direction compared to when the dimension in the Y direction in the first communication channel 110 is larger than the dimension in the Z direction in the first connecting channel 121.

In the head chip 50 according to the present embodiment, there is adopted the configuration in which the flow channel cross-sectional area of the first connecting channel 121 in the connecting upstream opening as a connecting portion to the first communication channel 110 is larger than the flow channel cross-sectional area of the first connecting channel 121 in the connecting downstream opening as a connecting portion to the manifold 123.

According to this configuration, it is possible to make the ink smoothly flow into the first connecting channel 121 from the first communication channel 110. On this occasion, it becomes easy to discharge the bubble generated at, for example, an upstream side of the first connecting channel 121 to the manifold 123 through the first connecting channel 121. Thus, it is possible to prevent the bubble from being discharged outside through the first nozzle hole 115 to perform high-accuracy printing.

Moreover, since the flow channel cross-sectional area of the first connecting channel 121 is different between the upstream side and the downstream side, it is possible to adjust the flow channel cross-sectional area of the first connecting channel 121 by adjusting the dimension in the Z direction of the first connecting channel 121 when adjusting the flow channel resistance of the first return channel. Thus, it is easy to ensure a room for the adjustment when adjusting the flow channel resistance of the first return channel.

In the head chip 50 according to the present embodiment, there is adopted the configuration in which the flow channel cross-sectional area of the first connecting channel 121 gradually decreases in the direction from the lower end opening toward the upper end opening.

According to this configuration, it is possible to gradually increase the flow rate of the ink in the direction from the lower end opening toward the upper end opening in the first connecting channel 121. Thus, it is possible to make the ink more smoothly flow through the first connecting channel 121.

In the head chip 50 according to the present embodiment, there is adopted the configuration in which the dimension in the X direction is different between the communication downstream opening as the connecting portion in the first communication channel 110 to the first connecting channel 121 and the lower end opening of the first connecting channel 121.

According to this configuration, the return plate 52 and the first back plate 63 are overlapped with each other so that one of the communication downstream opening of the first communication channel 110 and the lower end opening of the first connecting channel 121 smaller in dimension in the X direction falls within the range of the other of these openings larger in dimension in the X direction. Thus, it is possible to suppress the variation in communication area of the communication downstream opening and the lower end opening between the first communication channels 110 and between the first connecting channels 121 due to the processing accuracy or the like compared to when setting the dimensions in the X direction of the communication downstream opening and the lower end opening so as to be equivalent to each other. Thus, it is easy to stabilize the flow channel resistance in each of the first return channels.

In the head chip 50 according to the present embodiment, there is adopted the configuration in which the plurality of first communication channels 110 and the plurality of second communication channels 111 are alternately formed in the X direction in the return plate 52, and the plurality of first connecting channels 121 and the plurality of second connecting channels 122 are alternately formed in the X direction in each of the back plates 63, 103.

According to this configuration, it is possible to arrange the first communication channels 110 and the second communication channels 111 so as to overlap each other when viewed from the X direction, and arrange the first connecting channels 121 and the second connecting channels 122 so as to overlap each other when viewed from the X direction. Therefore, it is possible to achieve the reduction in size in the Y direction of the head chip 50 compared to when forming the first communication channels 110 and the second communication channels 111 at a distance in the Y direction, and forming the first connecting channels 121 and the second connecting channels 122 at a distance in the Y direction.

Since the inkjet head 5 and the printer 1 according to the present embodiment are equipped with the head chip 50 described above, it is possible to achieve the reduction in size in a direction crossing the Z direction while ensuring the desired ejection performance.

(Other Modified Examples)

It should be noted that the scope of the present disclosure is not limited to the embodiment described above, but a variety of modifications can be applied within the scope or the spirit of the present disclosure.

For example, in the embodiment described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiment described above, the description is presented citing the configuration (a so-called shuttle machine) in which the inkjet heads move with respect to the recording target medium when performing printing as an example, but this configuration is not a limitation. The configuration related to the present disclosure can be adopted as the configuration (a so-called stationary head machine) in which the recording target medium is moved with respect to the inkjet heads in the state in which the inkjet heads are fixed.

In the embodiment described above, there is explained when the recording target medium P is paper, but this configuration is not a limitation. The recording target medium P is not limited to paper, but can also be a metal material or a resin material, and can also be food or the like.

In the embodiment described above, there is explained the configuration in which the liquid jet heads are installed in the liquid jet recording device, but this configuration is not a limitation. Specifically, the liquid to be jetted from the liquid jet heads is not limited to what is landed on the recording target medium, but can also be, for example, a medical solution to be blended during a dispensing process, a food additive such as seasoning or a spice to be added to food, or fragrance to be sprayed in the air.

In the embodiment described above, there is explained the configuration in which the Z direction coincides with the gravitational direction, but this configuration is not a limitation, and it is also possible to set the Z direction to a direction along the horizontal direction.

In the embodiment described above, there is explained the configuration (so-called pulling-shoot) of deforming the actuator plate in the direction of increasing the volume of the ejection channel due to the application of the drive voltage, and then restoring the actuator plate to thereby eject the ink, but this configuration is not a limitation. It is possible for the head chip according to the present disclosure to be provided with a configuration (so-called pushing-shoot) in which the ink is ejected by deforming the actuator plate in a direction of reducing the volume of the ejection channel due to the application of the voltage. When performing the pushing-shoot, the actuator plate deforms so as to bulge toward the inside of the ejection channel due to the application of the drive voltage. Thus, the volume in the ejection channel decreases to increase the pressure in the ejection channel, and thus, the ink located in the ejection channel is ejected outside through the nozzle hole. When setting the drive voltage to zero, the actuator plate is restored. As a result, the volume in the ejection channel is restored.

In the embodiment described above, there is explained the configuration in which the flow channel resistance of the connecting channels 121, 122 is adjusted by adjusting the dimensions in the Z direction of the connecting channels 121, 122, but this configuration is not a limitation. It is possible to adjust the flow channel resistance of the connecting channels 121, 122 by adjusting the dimensions in the X direction and the Y direction in the connecting channels 121, 122 in, for example, the cover plate processing step S17.

In the embodiment described above, there is explained when the communication channels 110, 111 extend linearly in the Y direction, but this configuration is not a limitation. The communication channels 110, 111 can extend in a direction crossing the Y direction when viewed from the Z direction. Further, the communication channels 110, 111 can each be formed so as to have, for example, a curved shape when viewed from the Z direction.

In the embodiment described above, there is explained when the communication channels 110, 111 penetrate the return plate 52 in the Z direction throughout the entire length in the Y direction, but this configuration is not a limitation. As long as the communication channels 110, 111 have the configuration of communicating at least the ejection channels 71, the nozzle holes 115, and the connecting channels 121, 122 with each other, respectively, it is sufficient for a part of each of the communication channels 110, 111 to penetrate the return plate 52 in the Z direction.

In the embodiment described above, there is explained the configuration in which the dimension in the Z direction in the connecting channels 121, 122 is larger than the dimension in the Y direction in the communication channels 110, 111, but this configuration is not a limitation. It is possible for the dimension in the Z direction in the connecting channels 121 to be no larger than the dimension in the Y direction in the communication channels 110, 111.

In the embodiment described above, there is explained the configuration in which the flow channel cross-sectional area of each of the connecting channels 121, 122 gradually decreases in the direction from below to above, but this configuration is not a limitation. It is possible to adopt a configuration in which the flow channel cross-sectional area of each of the connecting channels 121, 122 gradually increases in the direction from below to above, or is uniform throughout the entire length.

In the embodiment described above, there is explained the configuration in which the dimension in the X direction is different between the communication downstream opening as the connecting portion of the first communication channel 110 to the first connecting channel 121 and the connecting upstream opening as the connecting portion of the first connecting channel 121 to the first communication channel 110, but this configuration is not a limitation. The dimension in the X direction of the communication downstream opening as the connecting portion of the first communication channel 110 to the first connecting channel 121 and the dimension in the X direction of the connecting upstream opening as the connecting portion of the first connecting channel 121 to the first communication channel 110 can be equal to each other.

In the embodiment described above, there is explained the configuration in which the chip modules 51A, 51B are overlapped with each other, but this configuration is not a limitation. It is possible to configure the head chip 50 only with the first chip module 51A.

In the embodiment described above, there is explained the configuration in which the plurality of first communication channels 110 and the plurality of second communication channels 111 are alternately formed in the X direction, and the plurality of first connecting channels 121 and the plurality of second connecting channels 122 are alternately formed in the X direction, but this configuration is not a limitation. It is possible to adopt a configuration in which the plurality of first communication channels 110 and the plurality of second communication channels 111 do not overlap each other (separated in the Y direction) when viewed from the X direction, and the plurality of first connecting channels 121 and the plurality of second connecting channels 122 do not overlap each other (separated in the Y direction) when viewed from the X direction. In this case, it is easy to adjust the dimension between the plurality of first communication channels 110 and the plurality of second communication channels 111, and the dimension between the plurality of first connecting channels 121 and the plurality of second connecting channels 122.

Besides the above, it is arbitrarily possible to replace the constituents in the embodiment described above with known constituents within the scope or the spirit of the present disclosure, and it is also possible to arbitrarily combine the modified examples described above with each other.

What is claimed is:

1. A head chip comprising:

a first ejection section in which a plurality of first jet channels extending in a first direction is formed in a second direction crossing the first direction;

a jet hole plate which has a plurality of first jet holes individually communicated with the plurality of first jet channels, and which is arranged at a first side in the first direction of the first ejection section;

a return plate which has a plurality of first communication channels extending in a third direction crossing the second direction when viewed from the first direction, and individually communicating the plurality of first jet channels and the plurality of first jet holes with each other in a first side end part in the third direction, and which is arranged between the first ejection section and the jet hole plate in the first direction; and a flow channel plate which has a plurality of first connecting channels extending in the first direction, individually communicated with the plurality of first communication channels in second side end parts located at an opposite side to a first side in the third direction to constitute first return channels together with the corresponding first communication channels, and a manifold communicated in a lump with the plurality of first connecting channels, and which is arranged at a second side in the third direction with respect to the first ejection section.

2. The head chip according to claim 1, wherein a dimension in the first direction in the first connecting channel is larger than a dimension in the third direction in the first communication channel.

3. The head chip according to claim 1, wherein a flow channel cross-sectional area of the first connecting channel is larger in a connecting upstream opening as a connecting portion to the first communication channel than in a connecting downstream opening as a connecting portion to the manifold.

4. The head chip according to claim 3, wherein the flow channel cross-sectional area of the first connecting channel gradually decreases in a direction from the connecting upstream opening toward the connecting downstream opening.

5. The head chip according to claim 1, wherein a dimension in the second direction is different between a communication downstream opening as a connecting portion of the first communication channel to the first connecting channel, and a connecting upstream opening as a connecting portion of the first connecting channel to the first communication channel.

6. The head chip according to claim 1, further comprising:

a second ejection section in which a plurality of second jet channels extending in the first direction is formed in the second direction, and which is arranged at an opposite side to the first ejection section with respect to the flow channel plate, wherein the jet hole plate is provided with a plurality of second jet holes individually communicated with the plurality of second jet channels, the return plate is provided with a plurality of second communication channels extending in the third direction, and individually communicating the plurality of second jet channels and the plurality of second jet holes with each other in the second side end part in the third direction, the flow channel plate is provided with a plurality of second connecting channels extending in the first direction, and individually communicated with the plurality of second communication channels in the first side end part in the third direction to constitute second return channels together with the second communication channels, the plurality of second connecting channels is communicated in a lump with the manifold, the plurality of first communication channels and the plurality of second communication channels are formed alternately in the second direction in the return plate, and the plurality of first connecting channels and the plurality of second connecting channels are formed alternately in the second direction in the flow channel plate.

7. A method of manufacturing a head chip including an ejection section in which a plurality of jet channels extending in a first direction is formed in a second direction crossing the first direction, a jet hole plate which has a plurality of jet holes individually communicated with the plurality of jet channels, and which is arranged at a first side in the first direction of the ejection section, a return plate which has a plurality of communication channels extending in a third direction crossing the second direction when viewed from the first direction, and individually communicating the plurality of jet channels and the plurality of jet holes with each other in a first side end part in the third direction, and which is arranged between the ejection section and the jet hole plate in the first direction, and a flow channel plate which has a plurality of connecting channels extending in the first direction, individually communicated with the plurality of communication channels in second side end parts located at an opposite side to a first side in the third direction to constitute return channels together with the corresponding communication channels, and a manifold communicated in a lump with the plurality of connecting channels, and which is arranged at a second side in the third direction with respect to the ejection section, the method comprising:

a first overlapping step of overlapping the ejection section and the flow channel plate with each other in the third direction;

a second overlapping step of overlapping the return plate with the ejection section and the flow channel plate from one side in the first direction;

a third overlapping step of overlapping the jet hole plate with the return plate from the one side in the first direction; and an adjusting step of adjusting a dimension of the connecting channel prior to the second overlapping step to adjust a flow channel resistance in the connecting channel.

8. The method of manufacturing the head chip according to claim 7, wherein in the adjusting step, cutting processing is performed on an end surface facing to the first direction of the flow channel plate to thereby adjust a length in the first direction in the connecting channel.

* * * * *